(12) United States Patent
Candes et al.

(10) Patent No.: US 7,840,625 B2
(45) Date of Patent: Nov. 23, 2010

(54) METHODS FOR PERFORMING FAST DISCRETE CURVELET TRANSFORMS OF DATA

(75) Inventors: Emmanuel Candes, Los Angeles, CA (US); David Donoho, Setauket, NY (US); Laurent Demanet, Pasadena, CA (US)

(73) Assignees: California Institute of Technology, Pasadena, CA (US); Stanford University, Palo Alto, CA (US)

( * ) Notice: Subject to any disclaimer, the term of this patent is extended or adjusted under 35 U.S.C. 154(b) by 1205 days.

(21) Appl. No.: 11/400,048

(22) Filed: Apr. 7, 2006

(65) Prior Publication Data

US 2007/0038691 A1    Feb. 15, 2007

Related U.S. Application Data

(60) Provisional application No. 60/669,267, filed on Apr. 7, 2005.

(51) Int. Cl.
*G06F 17/14* (2006.01)
(52) U.S. Cl. .................................... 708/402
(58) Field of Classification Search .......... 708/400–402
See application file for complete search history.

(56) References Cited

U.S. PATENT DOCUMENTS

2005/0286795 A1* 12/2005 Zhang ........................ 382/268

OTHER PUBLICATIONS

Anderson, C.R.,"Rapid computation of the discrete Fourier transform," vol. 17 , Issue 4, pp. 913-919 (Jul. 1996).

Beylkin, G., et al., "Fast wavelet transforms and numerical algorithms," Comm. on Pure and Appl. Math. 44 pp. 141-183 (1991).

Beylkin, G., "On the fast Fourier transforms of functions with singularities", Comput. Harmon. Anal., 2-4, pp. 363-381 (1995).

Candes, E.J., "Harmonic Analysis of Neural Networks," Applied and Computational Harmonic Analysis 6, pp. 197-218 (1999).

Candes, E.J., et al., "The Curvelet representation of wave propagators is optimally sparse," Comm. Pure Appl. Math, 58-11, pp. 1472-1528 (2005).

Candes, E.J., et al., "Ridgelets: The key to higher-dimensional intermittency?" Phil. Trans. R. Soc. Lond. A. 357, pp. 2495-2509 (1999).

Candes, E.J., et al., "Curvelets—A surprisingly effective nonadaptive representation for objects with edges," from *Curves and Surfaces*, pp. 105-120, Vanderbuilt Press (2000).

Candes, E.J., et al., "Recovering edges in ill-posed inverse problems:optimality of curvelet frames," Ann. Statist. 3, pp. 784-842 (2002).

(Continued)

*Primary Examiner*—Tan V Mai

(57) ABSTRACT

Fast digital implementations of the second generation curvelet transform for use in data processing are disclosed. One such digital transformation is based on unequally-spaced fast Fourier transforms (USFFT) while another is based on the wrapping of specially selected Fourier samples. Both digital transformations return a table of digital curvelet coefficients indexed by a scale parameter, an orientation parameter, and a spatial location parameter. Both implementations are fast in the sense that they run in about $O(n^2 \log n)$ flops for n by n Cartesian arrays or about $O(N \log N)$ flops for Cartesian arrays of size $N=n^3$; in addition, they are also invertible, with rapid inversion algorithms of about the same complexity.

26 Claims, 18 Drawing Sheets

OTHER PUBLICATIONS

E. J. Candes, et al., "New tight frames of curvelets and optimal representations of objects with piecewise C2 singularities," Comm. on Pure and Appl. Math 57, 219-266 (2004).

Candes, E.J., et al., "New multiscale transforms, minimum total variation synthesis:application to edge-preserving image reconstruction," Sig. Process., special issue on Image and Video Coding Beyond Standards 82, pp. 1519-1543 (2002).

Do, M.N., et al."Contourlets" (chapter), in Beyond Wavelets (2003) (book).

Do, M.N., et al., "The contourlet transform: an efficient directional multiresolution image representation," IEEE Trans. Im Proc. (2005).

Do, M.N., et al., Contourlets: A Directional Multiresolution Image Representation (2001).

Donoho, D.L., et al., "Wedgelets:nearly-minimax estimation of edges," Ann. Statist. 27 pp. 859-897 (1999).

Donoho, D.L., et al., "Digital curvelet transform: strategy, implementation, experiments," Technical Report, Stanford University (1999).

Donoho, D.L., et al., "Beamlets and Multiscale Image Analysis," Springer, Lecture Notes in Computational Science and engineering: Multiscale and Multiresolution Methods (2001).

Duijndam, A.J. et al., "Nonuniform fast fourier transform," Geophys. 64-2,pp. 539-551, 64-2 (1992).

Dutt, A., et al., "Fast Fourier Transforms for nonequispaced data," SIAM J. Asci. Stat. Comput. 14-6 pp. 1368-1393 (1993).

Dutt, A., et al., "Fast Fourier Transforms for nonequispaced data II" Appl. Comput. Harmon Anal. 2, pp. 85-100 (1995).

Flesia, A.G., et al., "Digital implementation of ridgelet packets," (chapter) in Beyond Wavelets (2003).

Guo, K., et al. "Wavelets with composite dilations," Electr. Res. Ann. AMS 10, pp. 78-87 (2004).

Guo, K, et al., "Wavelets with Composite dilations and their MRA Properties" Appl. Comp. Harmon Anal. (2005).

Herrmann, F.J., et al., "Separation of primaries and multiples by non-linear estimation in the curvelet domain," EAGE 66th Conference & Exhibition.

Labate, D., et al., "Sparse Multidimensional Representation using Shearlets," SPIE conf. Wavelets XI (2005).

Smith, H.A., "A Parametrix construction for wave equations with C1, 1 coefficents", Ann. Inst. Fourier, 48, pp. 797-835 (1998).

Starck, J.L., et al., "The Curvelet transform for image denoising," IEEE Trans. IM Proc., 11-6,pp. 670-684 (2002).

Vandergheyst, P., et al. "Directonal dyadic wavelet transforms: design and algorithms," IEEE Trans, Im Proc. 11-4, pp. 363-372 (2002).

R. H. Chan and M. K. Ng. Conjugate gradient methods for Toeplitz systems. *SIAM Rev.* 38 (1996), 427-482.

H. Douma and M. V. de Hoop. Wave-character preserving prestack map migration using curvelets. Presentation at the *Society of Exploration Geophysicists*, Denver, CO, 2004.

A. Dutt and V. Rokhlin, Fast Fourier transforms for nonequispaced data II. *Appl. Comput. Harmon. Anal.*, 2 (1995), 85-100.

G. Hennenfent and F.J. Herrmann, Seismic denoising with unstructured curvelets, Computing in Science & Engineering, May/Jun. 2006, 16-25.

F. J. Herrmann, P. P. Moghaddam, and C.C. Stolk, Sparsity- and continuity-promoting seismic image recovery with curvelet frames. Department of Applied Mathematics, University of Twente, the Netherlands Jul. 19, 2007.

E. Le Pennec and S. Mallat. Sparse geometric image representations with bandelets. *IEEE Trans. Image Process.* 14 (2005), 423-438.

E. P. Simoncelli and W. T. Freeman. The Steerable Pyramid: A Flexible Architecture for Multi-Scale Derivative Computation. *IEEE Second Int 'l Conf on Image Processing.* Washington DC, Oct. 1995.

E. P. Simoncelli, W. T. Freeman, E. H. Adelson, and D. J. Heeger. Shiftable multi-scale transforms [or what's wrong with orthonormal wavelets]. *IEEE Trans. Information Theory, Special Issue on Wavelets* 38 (1992), 587-607.

J.L. Starck, N. Aghanim and O. Forni, Detection and Discrimination of cosmological non-Gaussian signatures by multi-scale methods. *Astronomy and Astrophysics* 416 (2004), 9-17.

J. L. Starck, M. Elad, and D. L. Donoho. Redundant multiscale transforms and their application for morphological component analysis. *Advances in Imaging and Electron Physics* 132 (2004).

G. Strang. A proposal for Toeplitz matrix calculations. *Stud. Appl. Math.* 74 (1986), 171-176.

* cited by examiner

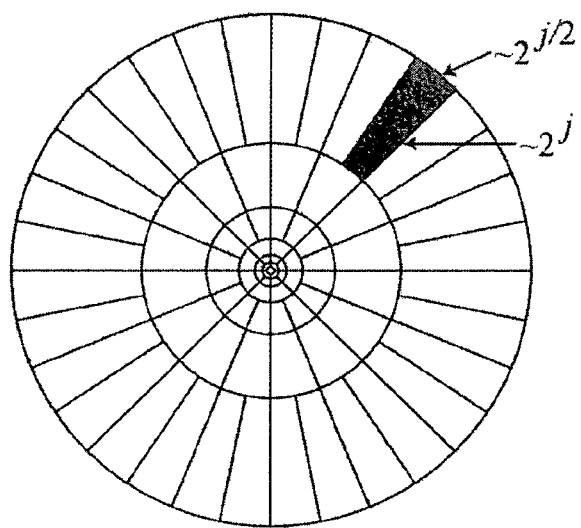 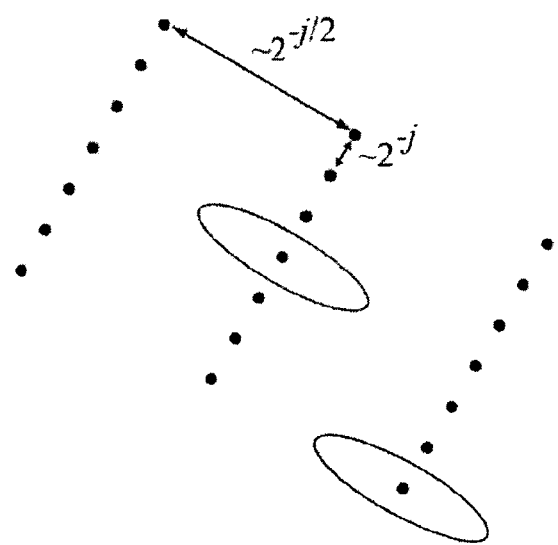
FIGURE 1A                    FIGURE 1B

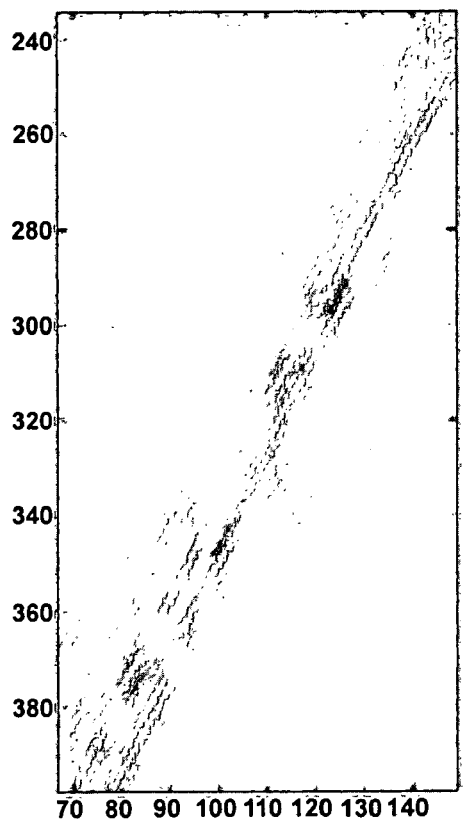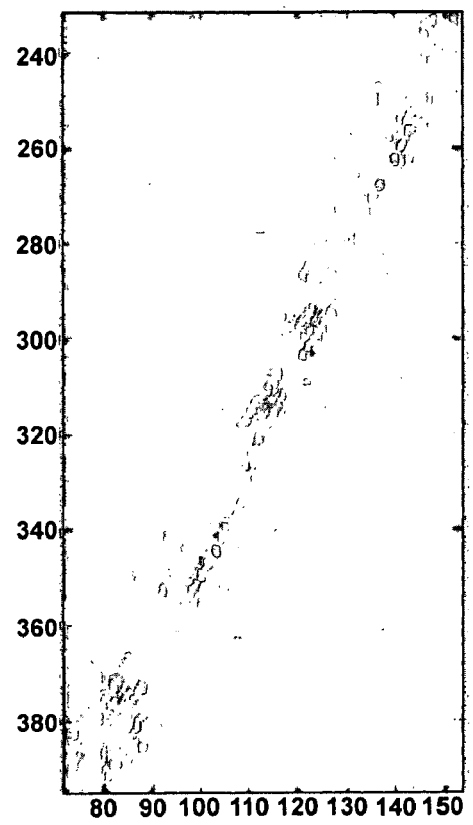
FIG. 13C  FIG. 13D

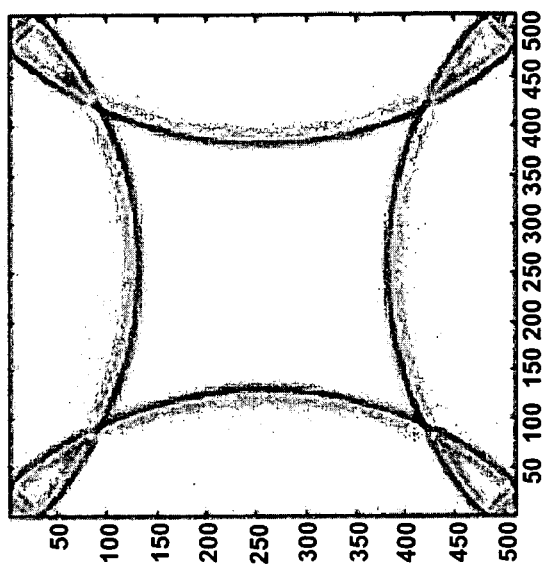
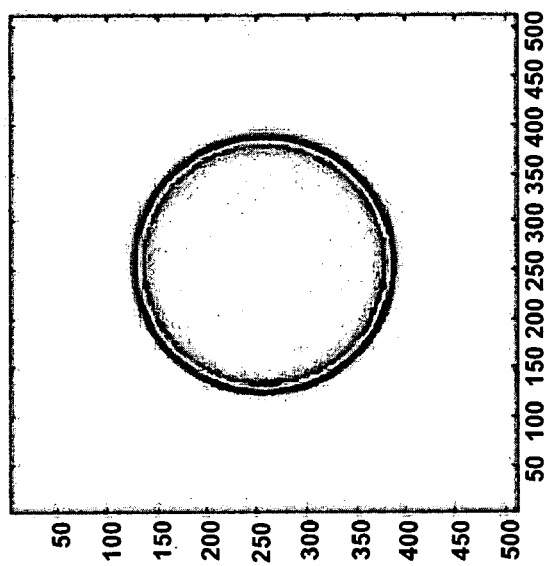
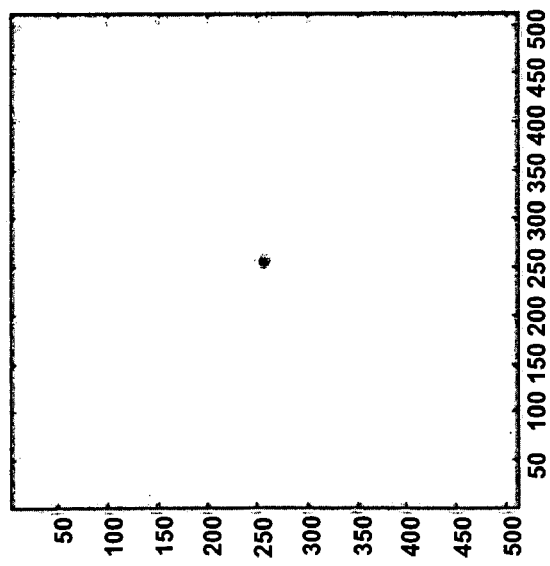
FIG. 14C
FIG. 14B
FIG. 14A

METHODS FOR PERFORMING FAST DISCRETE CURVELET TRANSFORMS OF DATA

CROSS-REFERENCE TO RELATED APPLICATION

This application claims the benefit of U.S. provisional patent application Ser. No. 60/669,267, filed Apr. 7, 2005 for a "Fast Digital Curvelet Transforms" by Emmanuel Candès, Laurent Demanet, and David Donoho, the disclosure of which is including the material presented in compact discs, incorporated herein by reference.

STATEMENT REGARDING FEDERALLY SPONSORED RESEARCH OR DEVELOPMENT

Subject matter disclosed in this specification was supported at least in part through governmental grants no. DE-FG02-02ER25529 awarded by the Department of Energy and no. DMS-0140540 awarded by the National Science Foundation, and is subject to certain governmental rights and interests.

BACKGROUND

1. Field

The subject matter disclosed and claimed in this specification generally relates to methods and apparatus for signal processing, data analysis, and scientific computing.

2. Description of the Art

The Annex incorporated as part of this specification is a copy of a Technical Report entitled "Fast Digital Curvelet Transforms" published on-line in or about July 2005 and modified in March 2006. The Annex will be referred to in the specification that follows for tables, proofs, and detailed mathematical explanations. The Annex forms an integral part of the specification as a whole.

The last two decades have seen tremendous activity in the development of new mathematical and computational tools based on multiscale ideas. Today, multiscale or multiresolution ideas permeate many fields of contemporary science and technology. In the information sciences and especially signal processing, the development of wavelets and related ideas led to convenient tools to navigate through large datasets, to transmit compressed data rapidly, to remove noise from signals and images, and to identify crucial transient features in such datasets. In the field of scientific computing, wavelets and related multiscale methods sometimes allow for the speeding up of fundamental scientific computations such as in the numerical evaluation of the solution of partial differential equations. See reference 2 (this and other references are listed below at the end of the description of the preferred embodiments). By now, multiscale thinking is associated with an impressive and ever increasing list of success stories.

Despite considerable success, intense research in the last few years has shown that classical multiresolution ideas are far from being universally effective. Indeed, just as it was recognized that Fourier methods were not good for all purposes and consequently new systems such as wavelets were introduced, alternatives to wavelet analysis have been sought. In signal processing for example, an incentive for seeking an alternative to wavelet analysis is the fact that interesting phenomena occur along curves or sheets, e.g., edges in a two-dimensional image.

While wavelets are certainly suitable for dealing with objects where the interesting phenomena, e.g., singularities, are associated with exceptional points, they are ill-suited for detecting, organizing, or providing a compact representation of intermediate dimensional structures. Given the significance of such intermediate dimensional phenomena, a vigorous research effort has developed to provide better adapted alternatives by combining ideas from geometry with ideas from traditional multiscale analysis. See references 17, 19, 4, 31, 14, and 16.

A special member of this emerging family of multiscale geometric transforms is the curvelet transform, see references 8, 12, and 10, which was developed by Emmanuel Candès and David Donoho and others in the last few years in an attempt to overcome inherent limitations of traditional multiscale representations such as wavelets. Conceptually, the curvelet transform is a multiscale pyramid with many directions and positions at each length scale, and needle-shaped elements at fine or small scales. This pyramid is nonstandard, however. Indeed, curvelets have useful geometric features that set them apart from wavelets and the like. For instance, curvelets obey a parabolic scaling relation which says that at scale $2^{-j}$, each element has an envelope which is aligned along a 'ridge' of length $2^{-j/2}$ and width $2^{-j}$.

Curvelets are interesting because they efficiently address very important problems where wavelet ideas are far from ideal. Three examples of such problems are:

1. Optimally sparse representation of objects with edges. Curvelets provide optimally sparse representations of objects or images which display curve-punctuated smoothness, that is, smoothness except for discontinuity along a general curve with bounded curvature. Such representations are nearly as sparse as if the object were not singular and, as it turns out, far sparser than the wavelet decomposition of the object.

This phenomenon has immediate applications in approximation theory and in statistical estimation. As shown in Section 1.2 of the Annex, the representation is optimal in the sense that no other representation can yield a smaller asymptotic error with the same number of terms. The implication in statistics is that one can recover such objects from noisy data by simple curvelet shrinkage and obtain a Mean Squared Error (MSE) order of magnitude better than what is achieved by more traditional methods. In fact, the recovery is provably asymptotically near-optimal. The statistical optimality of the curvelet shrinkage extends to other situations involving indirect measurements as in a large class of ill-posed inverse problems. See reference 9.

2. Optimally sparse representation of wave propagators. Curvelets may also be a very significant tool for the analysis and the computation of partial differential equations. For example, a remarkable property is that curvelets faithfully model the geometry of wave propagation. Indeed, the action of the wave-group on a curvelet is well approximated by simply translating the center of the curvelet along the Hamiltonian flows. A physical interpretation of this result is that curvelets may be viewed as coherent waveforms with enough frequency localization so that they behave like waves but at the same time, with enough spatial localization so that they simultaneously behave like particles. See references 5 and 36.

This can be rigorously quantified, as alluded to in Section 1.2 of the Annex, in which the curvelet matrix is explained to be sparse and well-organized. It is sparse in the sense that the matrix entries in an arbitrary row or column decay nearly exponentially fast (i.e., faster than any negative polynomial). And it is well-organized in the sense that the very few non-negligible entries occur near a few shifted diagonals. Informally speaking, one can think of curvelets as near-eigen functions of the solution operator to a large class of hyperbolic differential equations.

On the one hand, the enhanced sparsity simplifies mathematical analysis and allows one to prove sharper inequalities. On the other hand, the enhanced sparsity of the solution operator in the curvelet domain allows the design of new numerical algorithms with far better asymptotic properties in terms of the number of computations required to achieve a given accuracy. See reference [00127] 6.

3. Optimal image reconstruction in severely ill-posed problems. Curvelets also have special microlocal features which make them especially adapted to certain reconstruction problems with missing data. For example, in many important medical applications, the goal is to reconstruct an object $f(x_1,x_2)$ from noisy and incomplete tomographic data, i.e., a subset of line integrals of f corrupted by additive noise modeling uncertainty in the measurements. See reference 33. This is especially challenging when one has incomplete data or in other words, when one cannot observe projections along every possible line but only along a given subset of such lines.

Because of its relevance in biomedical imaging, this problem has been extensively studied (as may be seen in the vast literature on computed tomography). Yet, curvelets offer surprisingly new quantitative insights. See reference 11. For example, a beautiful application of the phase-space localization of the curvelet transform allows a very precise description of those features of the object of f which can be reconstructed accurately from such data and how well, and of those features which cannot be recovered.

Roughly speaking, as shown in Section 1.2 of the Annex, the data acquisition geometry separates the curvelet expansion of the object into two pieces in which the first part of the expansion can be recovered accurately while the second part cannot. What is interesting here is that one can provably reconstruct the "recoverable" part with an accuracy similar to that one would achieve even if one had complete data. A quantitative theory exists showing that for some statistical models that allow for discontinuities in the object to be recovered, there are simple algorithms based on the shrinkage of curvelet-biorthogonal decompositions, which achieve optimal statistical rates of convergence; that is, such that there are no other estimating procedures which, in an asymptotic sense, give fundamentally better MSEs. See reference 11.

To summarize, the curvelet transform is mathematically valid and it has a very promising potential in traditional (and perhaps less traditional) application areas for wavelet-like ideas such as image processing, data analysis, and scientific computing.

Curvelets were first introduced by Emmanuel Candès and David Donoho in reference 8 and have been around for a little over six years by now. Soon after their introduction, researchers developed numerical algorithms for their implementation (see references 37 and 18), and scientists have started to report on a series of practical successes (see, for example, references 39, 38, 27, 26, and 20. These implementations are based on the original construction, see reference 8, which uses a pre-processing step involving a special partitioning of phase-space followed by the ridgelet transform, see references 4 and 7, which is applied to blocks of data that are well localized in space and frequency.

In the last three or four years, however, curvelets have been redesigned in an effort to make them easier to use and understand. As a result, the new construction is considerably simpler and totally transparent. The new mathematical architecture suggests innovative algorithmic strategies, and provides the opportunity to improve upon earlier implementations.

To realize this potential though, and deploy this technology to a wide range of problems, fast and accurate discrete curvelet transforms operating on digital data are needed.

SUMMARY

It is an object of the subject matter disclosed and claimed in this specification to provide fast and accurate discrete curvelet transforms operating on digital data in order to realize the potential of curvelets and deploy this technology to a wide range of practical uses, such as image processing, data analysis, and scientific computing. The fast digital transforms additionally may be employed to achieve the advantages discussed in connection with optimally sparse representation of objects with edges, optimally sparse representation of wave propagators, and optimal image reconstruction in severely ill-posed problems.

This specification discloses new fast discrete curvelet transforms (FDCT's) that are simpler, faster, and less redundant than existing transforms. The new FDCT's are based on the curvelet transform described in reference 10. The new FDCT's run in $O(n^2 \log n)$ flops (floating point operations) for n by n Cartesian arrays, and are also invertible, with rapid inversion algorithms of about the same complexity.

Accordingly, an embodiment of the invention is directed to a method for manipulating data in a data processor, comprising performing a discrete curvelet transform on the data. This method may comprise the steps of (a) representing the data in the frequency space or Fourier domain by means of a Fourier transform; (b) dividing the Fourier transform of the data into dyadic annuli based on concentric squares for two-dimensional data or concentric cubes for three-dimensional data and each annulus is subdivided into trapezoidal regions for two-dimensional data or prismoids for three-dimensional data. The method for manipulating data in a data processor may further comprise using a smooth partition of unity, or square-root thereof, made of overlapping indicators. The method for manipulating data in a data processor may be such that each trapezoidal or prismoidal region corresponds to a given scale/orientation combination.

The method for manipulating data in a data processor may be such that the step of performing the transform further comprises: (c) a step of resampling the array of the data within each trapezoidal or prismoidal region in the Fourier domain, according to an equispaced grid tilted to be aligned with the axes of the trapezoid or prismoid; (d) a step of shearing each tilted grid into a Cartesian grid; (e) a step of applying the inverse Fast Fourier Transform to the data array on each Cartesian grid.

The step of resampling within each trapezoidal or prismoidal region may further comprise the step of performing unequispaced Fast Fourier Transforms.

The method for manipulating data in a data processor, comprising performing a discrete curvelet transform on the data, may also be such that the step of performing a digital curvelet transform on the data further comprises: (c') a step of wrapping the array of the data within each trapezoidal or prismoidal region in the Fourier domain into a rectangular or parallelepipedal region near the origin; (d') a step of applying the inverse Fast Fourier Transform to each wrapped data array, within each rectangular or parallelepipedal region near the origin.

The step of wrapping data within each trapezoidal or prismoidal region may comprise making use of periodization to extend Fourier samples inside the rectangular or parallelepipedal region. This method may be an isometry in exact arithmetic.

The method for manipulating data in a data processor, comprising performing a discrete curvelet transform on the data may further comprise the step of performing the transform runs in $O(n^2 \log n)$ floating point operations for n by n Cartesian arrays, wherein n is the number of discrete information bits in a direction along an x or a y axis. In three dimensions, the step of performing the transform runs in $O(n^3 \log n)$ floating point operations for n by n by n Cartesian arrays, wherein n is the number of discrete information bits in a direction along an x, a y or a z axis.

The method for manipulating data in a data processor, comprising performing a discrete curvelet transform on the data may be one in which the step for performing the transform further comprises returning a table of digital curvelet coefficients indexed by a scale parameter, an orientation parameter, and a spatial location parameter.

The method for manipulating data in a data processor may be one in which the transform is invertible by means of an inverse transform. The step of performing the inverse transform may comprise (a) taking as input the table of digital curvelet coefficients; (b) performing a Fast Fourier transform of the coefficients at each scale and angle.

The step of performing the inverse transform may further comprise (c) shearing the array of the Fourier-transformed data at each scale and angle onto a trapezoidal or prismoidal grid; (d) resampling each sheared data onto a Cartesian grid; (e) windowing by the corresponding indicator; (f) summing the contributing at each scale and angle; (g) performing an inverse Fourier transform of the sum. The step of resampling sheared data may comprise performing inverse unequispaced Fast Fourier transforms.

The step of performing the inverse transform may further comprise (c') unwrapping the array of the Fourier-transformed data at each scale and angle onto a trapezoidal or prismoidal region; (d') windowing by the corresponding indicator; (e') summing the contribution from each scale and angle; (f') performing an inverse Fourier transform of the sum. The step of unwrapping data onto a trapezoidal or prismoidal region may comprise making use of periodization to extend Fourier samples inside the trapezoidal or prismoidal region.

The step of performing the inverse transform may be one in which the inversion algorithm runs in about $O(n^2 \log n)$ floating point operations for n by n Cartesian arrays, wherein n is a number of discrete information bits in a direction along an x or a y axis. In three dimensions, The method according to claim 13 in which the inversion algorithm runs in about $O(n^3 \log n)$ floating point operations for n by n by n Cartesian arrays, wherein n is a number of discrete information bits in a direction along an x, a y or a z axis.

The method for manipulating data in a data processor comprising performing a discrete curvelet transform on the data may be used to compress data, identify transients or salient features in the data, conduct numerical simulations of partial differential equations, remove noise from signals or images, or restore otherwise degraded datasets, or solve inverse problems in computerized tomography.

BRIEF DESCRIPTION OF THE DRAWINGS

The present invention will be understood and appreciated more fully from the following detailed description taken in conjunction with the drawings in which:

FIGS. 1A and 1B are schematics that show the curvelet tiling of space and frequency. FIG. 1A schematically represents the induced tiling of the frequency plane and FIG. 1B schematically represents the spatial Cartesian grid associate;

FIGS. 9A-9F show curvelets at increasingly fine scales in which FIGS. 9A-9C show curvelets in the spatial domain as functions of the spatial variable x and FIGS. 9D-9F show curvelets in the frequency domain, the color maps being the same as in FIG. 8A (for FIGS. 9A-9C) and 8B (for FIGS. 9D-9F);

FIGS. 10A-10F show wavelets and curvelets at the finest scale in which FIG. 10A is a Meyer wavelet in space, FIG. 10B is a Meyer wavelet in frequency, FIG. 10C is an undersampled curvelet in space, FIG. 10D is an undersampled curvelet in frequency, FIG. 10E is a zoom view of the Meyer wavelet of FIG. 10A, and FIG. 10F is a zoom view of the undersampled curvelet of FIG. 10C;

FIGS. 11A-11C show a sparsity analysis of the curvelet and wavelet representations of a singular object in which FIG. 11A is the input image (and scale), FIG. 11B is a graph of the magnitude of the coefficients sorted in descending order for curvelets and three kinds of wavelets (Daubechies 3, Daubechies 5, and Meyer), and FIG. 11C is a graph of the partial reconstruction error $\|f-f_m\|/\|f\|$ for the four kinds of representations;

FIGS. 12A-12C show a sparcity analysis of the curvelet and wavelet representations of a seismogram in which FIG. 12A is a synthetic seismogram (and scale) corresponding to the acoustic response of a one-dimensional layered medium to a point source in which the x-axis is offset from the source and the y-axis is time, FIG. 12B is a graph showing the decay of the coefficients sorted in descending order for curvelets and three kinds of wavelets (Daubechies 3, Daubechies 5, and Meyer), and FIG. 12C is a graph of the partial reconstruction error for the four kinds of representations;

FIGS. 13A-13D illustrate image denoising using curvelets as applied with FDCT's. FIG. 13A shows the original image, a portion of the synthetic seismogram shown in FIG. 12A. FIG. 13B shows a noisy version of FIG. 13A in which Gaussian white noise has been applied. FIG. 13C is the denoised image using curvelets. FIG. 13D is the denoised image using wavelets; and FIGS. 14A-14E illustrate compression of a delta function wavefield located at the center of the domain as the initial condition and of the solution operator to the wave equation with periodic boundary conditions.

DETAILED DESCRIPTION OF THE PREFERRED EMBODIMENTS

Figure 2:
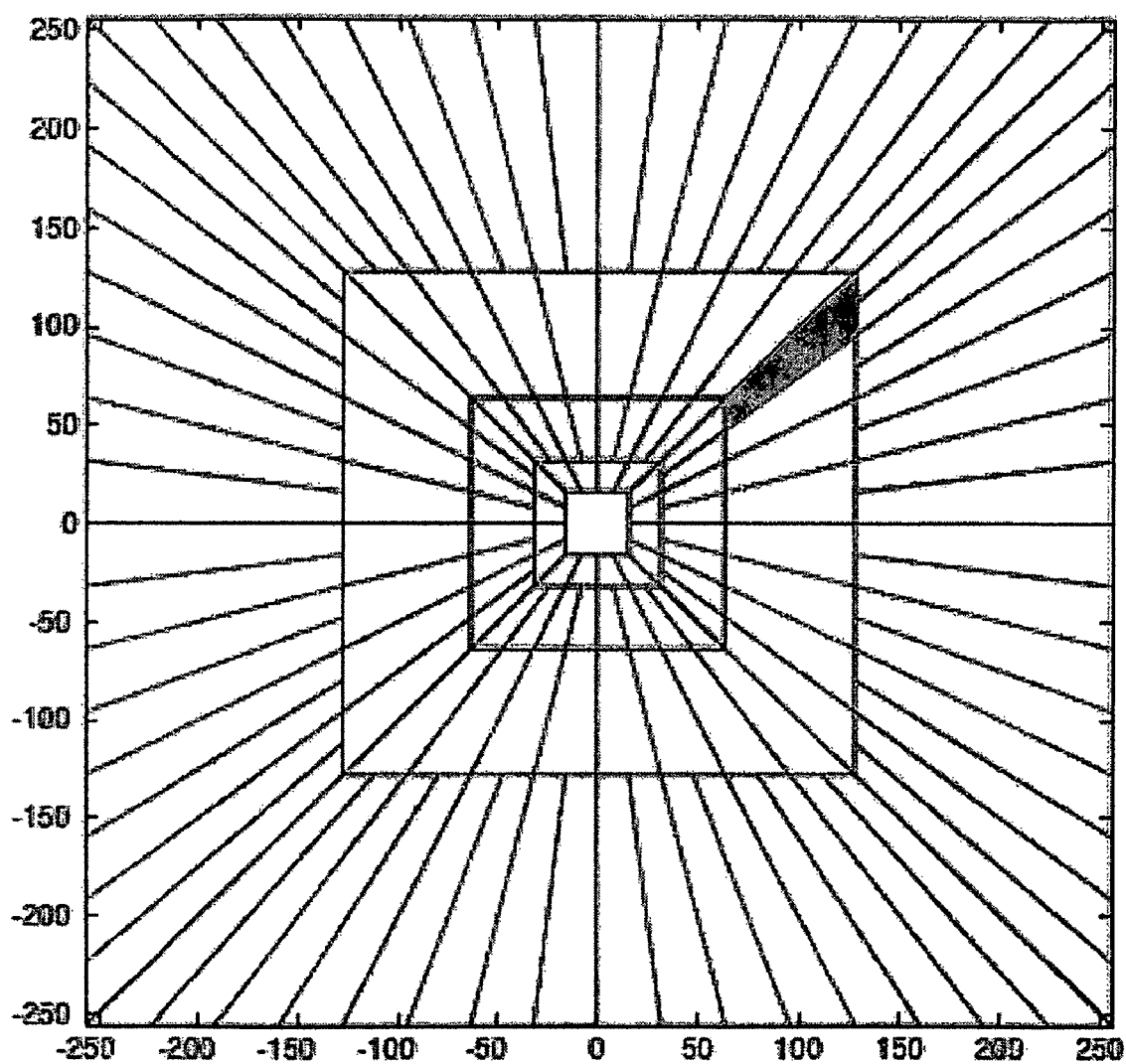
FIG. 2 shows a schematic that illustrates the basic digital tiling of the frequency plane.

The methods disclosed in this specification can be implemented on any processing unit that is capable of executing instructions of algorithms corresponding to the transforms set forth in this specification. Suitable processing units include, without limitation, analog processing units, digital processing units or mixtures or combinations thereof. These processing units are generally components of a computer of other device including a processing unit and peripherals capable of human interaction (keyboards and the like).

Suitable computers include those manufacture and sold through out the industry based on chips from companies like Intel, Motorla, IBM, HP, Sun Micosystems, Cirex AMD, or others and sold in computers manufactured and/or sold by company such as Dell, Apple, IBM, HP, Toshiba, Sony, or similar computers. The processing units and computers incorporating them are designed to execute software under the control of an operating system. Suitable operating systems include, without limitation, the WINDOWS operating systems from MicroSoft, the OS operating from Apple, the LINUX operating systems available from a variety of vendors, or other windowing operating systems. The algorithms for the transforms set forth in this application can be converted to software code in any number of convenient computer languages such as Fortran, C, C+, C++, or the like or newer programming languages geared to programming mathematical expressions, such as the Matlab® high-level language and interactive environment that enables users to perform computationally intensive tasks. The code may be stored on any suitable memory media, such as compact disk, hard drive, and the like.

The software package "CurveLab" implements the transforms disclosed in this specification. A computer program listing appendix for the "CurveLab" software package is included in the compact disc filed with this specification and is incorporated by reference. The software contains the Matlab® and C++ implementations of both the USFFT-based and the wrapping-based transforms. Several Matlab® scripts are provided to demonstrate how to use this software. Additionally, implementations of the three-dimensional (3D) discrete curvelet transform are also included.

Continuous-time curvelets, curvelet coefficients (Equations 2.4 and 2.5), coarse scale curvelets, and curvelet transforms are defined and described in Section 2 of the Annex. At the stage of the discussion in Section 2 of the Annex, two dimensions (2D) are assumed.

FIG. 1 summarizes the key components of the construction by depicting the curvelet tiling of space and frequency. The figure on the left in FIG. 1 represents the induced tiling of the frequency plane. In Fourier space, curvelets are supported near a "parabolic" wedge, and the shaded area in FIG. 1 represents such a generic wedge. The figure on the right in FIG. 1 schematically represents the spatial Cartesian grid associated with a given scale and orientation.

A few properties of the curvelet transform are listed below:

1. Tight-frame. Much like in an orthonormal basis, an arbitrary function can be easily expanded as a series of curvelets (see Equations 2.6 and 2.7 in the Annex).

2. Parabolic scaling. The frequency localization of $\phi_j$ implies the following spatial structure: $\phi_j(x)$ is of rapid decay away from a $2^{-j}$ by $2^{-j/2}$ rectangle with major axis pointing in the vertical direction. In short, the effective length and width obey the anisotropy scaling relation $$\text{length} \approx 2^{-j/2}, \text{width} \approx 2^{-j} \Rightarrow \text{width} \approx \text{length}^2$$

3. Oscillatory behavior. As is apparent from its definition, $\hat{\phi}_j(x)$ is actually supported away from the vertical axis $\omega_1$ but near the horizontal $\omega_2=0$ axis. In a nutshell, this says that $\phi_j(x)$ is oscillatory in the $x_1$-direction and lowpass in the $x_2$-direction. Hence, at scale $2^{-j}$, a curvelet is a little needle whose envelope is a specified "ridge" of effective length $2^{-j/2}$ and width $2^{-j}$, and which displays an oscillatory behavior across the main "ridge."

Digital Curvelet Transforms

This specification discloses two distinct implementations of the curvelet transform which are faithful to the mathematical transformation outlined in Section 2 of the Annex. These digital transformations are linear and take as input Cartesian arrays of the form $f[t_1,t_2]$, $0 \leq t_1$, $t_2 < n$. The output may be thought of as a collection of coefficients $c^D(j,l,k)$ obtained by Equation 3.1 in the Annex, the digital analog to Equation 2.4 in the Annex where each $\phi_{j,l,k}^D$ is a digital curvelet waveform (in the annex, here, and below, the superscript D stands for "digital").

As is standard in scientific computations, these digital waveforms which are implicitly defined by the algorithms are never actually built; formally, they are the rows of the matrix representing the linear transformation and are also known as Riesz representers. These waveforms are introduced because it will make the exposition clearer and because it provides a useful way to explain the relationship with the continuous-time transformation. The two digital transformations share a common architecture which is introduced first, before elaborating on the main differences.

Digital Coronization

Coronae and rotations are not especially adapted to Cartesian arrays. Instead, it is convenient to replace these concepts by Cartesian equivalents; here, "Cartesian coronae" based on concentric squares or cubes (instead of circles and spheres) and shears. Section 3.1 of the Annex explains the digital coronization.

FIG. 2 is a schematic that illustrates the basic digital tiling in two dimensions. The windows $\tilde{U}_{j,l}$ smoothly localize the Fourier transform near the sheared wedges obeying the parabolic scaling. The shaded region in FIG. 2 represents one such typical wedge (or trapezoid).

Digital Curvelet Transform via Unequispaced Fast Fourier Transforms

Section 3.2 of the Annex describes a first implementation of a fast digital curvelet transform via unequispaced or unequally spaced fast Fourier transforms (USFFT), whose architecture or algorithm is generally as follows:

1. Apply the two dimensional fast Fourier transform (2D FFT) and obtain Fourier samples $$\hat{f}[n_1,n_2], -n/2 \leq n_1, n_2 < n/2$$

2. For each scale/angle pair (j,l), resample (or interpolate) $\hat{f}[n_1,n_2]$ to obtain sampled values $\hat{f}[n_1,n_2-n_1 \tan \theta_l]$ for $(n_1, n_2) \in P_j$.

3. Multiply the interpolated (or sheared) object $\hat{f}$ with the parabolic window $\tilde{U}_j$, effectively localizing $\hat{f}$ near the parallelogram with orientation $\theta_l$, and obtain $$\tilde{f}_{j,l}[n_1,n_2]=\hat{f}[n_1,n_2-n_1 \tan \theta_l]\tilde{U}_j[n_1,n_2].$$

4. Apply the inverse 2D FFT to each $\tilde{f}_{j,l}$, hence collecting the discrete coefficients $c^D(j,l,k)$.

Of all the steps, the interpolation step is the less standard and is discussed in detail in Section 4.1 of the Annex. It is possible to design an algorithm which, for practical purposes, is exact and takes $O(n^2 \log n)$ flops for computation, and requires $O(n^2)$ storage, where $n^2$ is the number of pixels.

Section 4 of the Annex describes the USFFT transform in more detail. Section 4.1 describes the step of interpolation or resampling.

Figure 3:
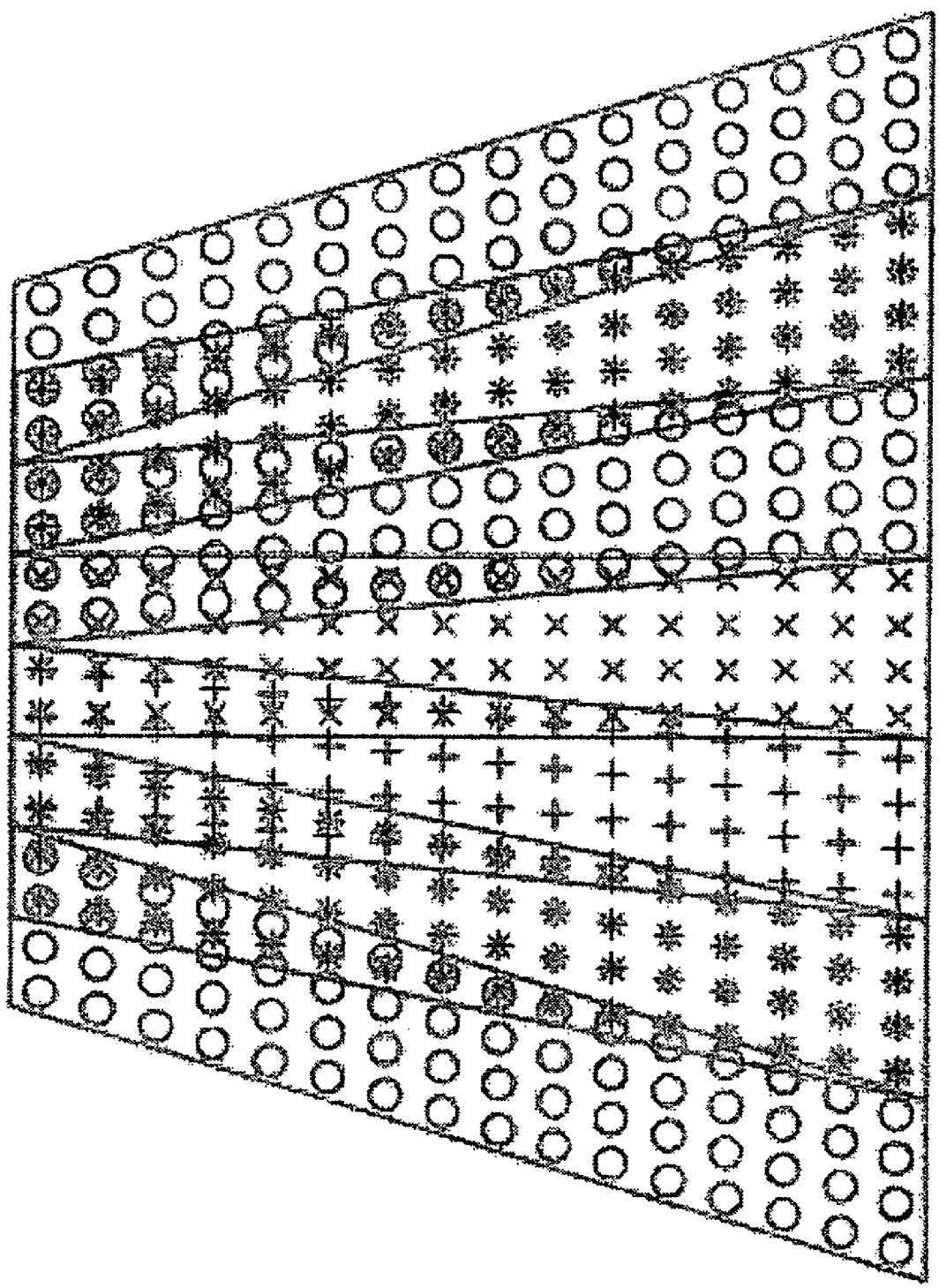
FIG. 3 illustrates the sampling within each parallelogramal region according to an equispaced grid aligned with the axes of the parallelogram.

FIG. 3 shows the structure of the irregular grid ($n_1$, $n_2$–n, tan $\theta_l$) at a fixed scale and for orientations in the "Eastern" quadrant. FIG. 3 illustrates the sampling within each parallelogramal region according to an equispaced grid aligned with the axes of the parallelogram. There as many parallelograms as there are angles $\theta_l\epsilon(-\pi/4,\pi/4)$.

Figure 4:
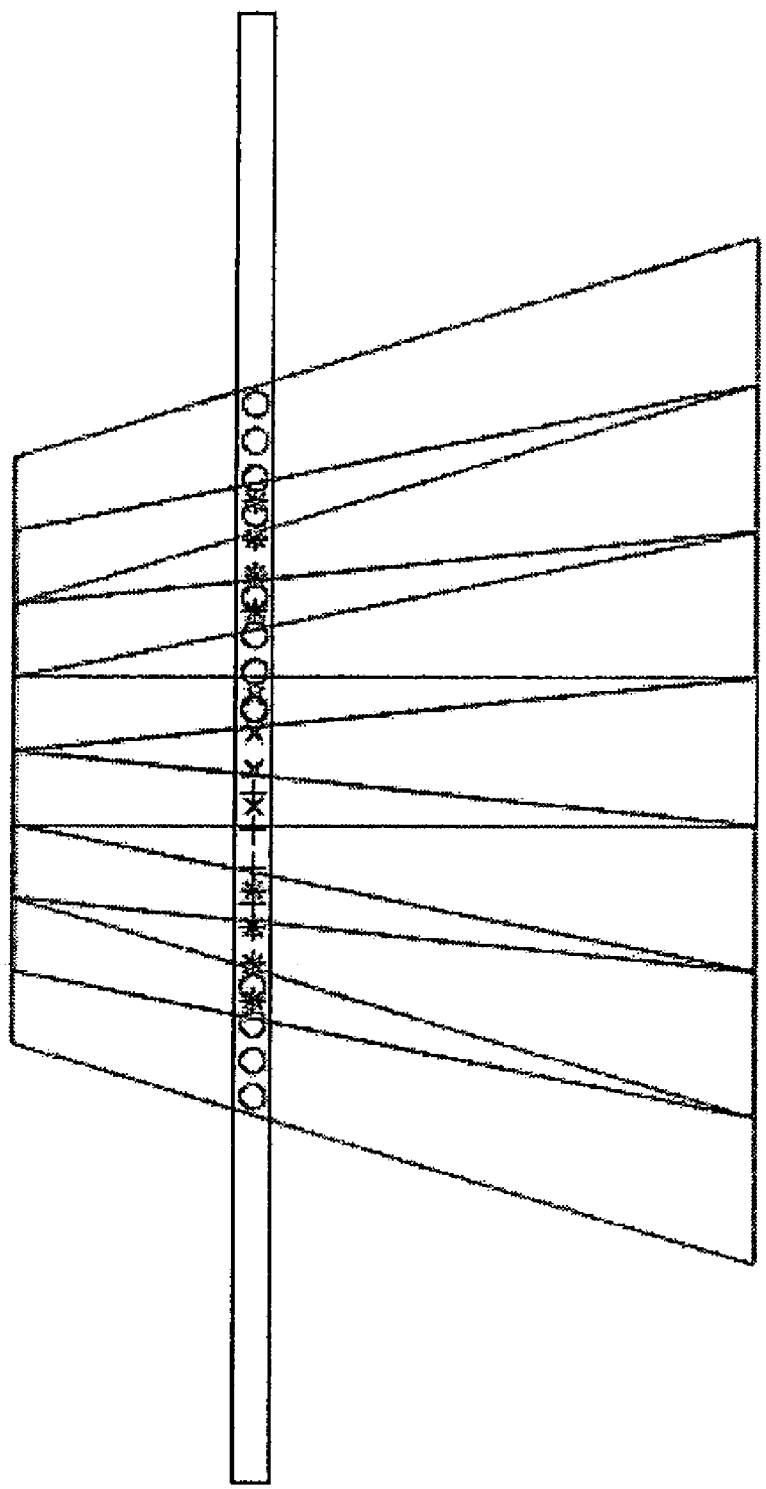
FIG. 4 is a schematic that illustrates the interpolation step of the USFFT transform.

FIG. 4 illustrates a key property of the USFFT version of the FDCT transform. The interpolation step is organized so that it is obtained by solving a sequence of one-dimensional problems. For a fixed column, a one-dimensional trigonometric polynomial is resampled on the mesh shown here.

Section 4.2 of the Annex discusses the appearance of digital curvelets and observes that, at a given scale, all digital curvelets are essentially obtained by shearing and translating a single reference element. Section 4.3 discusses the adjoint transformation and notes that each step of the curvelet transformation via USFFT has an evident adjoint, and the overall adjoint transformation is computed by taking the adjoint of each step and applying them in reverse order. The adjoint transformation shares all the basic properties of the forward transform. In particular, the cost of applying the adjoint is $O(n^2 \log n)$ flops, with $n^2$ being the number of pixels.

Section 4.4 discusses the inverse transformation of the USFFT. Looking at the flow of the algorithm for the USFFT set forth above, the first and the last steps may be seen to be easily invertible by means of FFT's. Conjugate gradients (CG's) are used to invert the combination of steps 2 and 3 (which in practice is effected scale by scale). Each CG iteration is effected by a series of one dimensional processes which, thanks to the special structure of the Gram matrix, can be accelerated as we will see in the next section. In practice, 20 CG iterations (at each scale) give about five digit accuracy. The practical cost of this approximate inverse is about ten times that of the forward transform. Section 8 of the Annex sets forth actual central processing unit (CPU) times.

Section 5 of the Annex further discusses unequispaced fast Fourier transforms. In particular, it discusses an algorithm for computing fast Fourier transforms and the resulting accuracy in terms of relative error (see Table 1 in the Annex). Computation of the adjoint USFFT and the use of a Toeplitz matrix for forward mapping are described in Sections 5.3 and 5.4 of the Annex.

Digital Curvelet Transform via Wrapping

Section 3.3 of the Annex describes the second implementation of a fast digital curvelet transform via wrapping.

The 'wrapping' approach assumes the same digital coronization as in Section 3.1 of the Annex, but makes a different, somewhat simpler choice of spatial grid to translate curvelets at each scale and angle. Instead of a tilted grid, a regular rectangular grid is assumed and 'Cartesian' curvelets are defined in essentially as, $$c(j,l,k)=\int f(\omega)\tilde{U}_j(S_{\theta_l}^{-1}\omega)e^{i<b,\omega>}d\omega.$$

The $S_{\theta_l}^{-T}b$ of formula 3.6 in the Annex has been replaced by $b\sim(k_1 2^{-j}, k_2 2^{-j/2})$ taking on values on a rectangular grid. As before, this formula for b is understood when $$\text{or } \left(\frac{3\pi}{4}, \frac{5\pi}{4}\right),$$

otherwise the roles of $L_{1,j}$ and $L_{2,j}$ are to be exchanged.

The difficulty behind this approach is that, in the frequency plane, the window $\tilde{U}_{j,l}[n_1,n_2]$ does not fit in a rectangle of size $\sim 2^j \times 2^{j/2}$, aligned with the axes, in which the 2D inverse FFT could be applied to compute the formula given in the above paragraph. After discretization, the integral over $\omega$ becomes a sum over $n_1,n_2$ which would extend beyond the bounds allowed by the 2-D inverse FFT. The resemblance of the formula given above in the above paragraph with a standard 2D inverse FFT is in that respect only formal.

To understand why respecting rectangle sizes is a concern, we recall that $\tilde{U}_{j,l}$ is supported in the trapezoidal region $$P_{j,l}=S_{\theta_l}P_j.$$

For most values of the angular variable $\theta_l$, $P_{j,l}$ is supported inside a rectangle $R_{j,l}$ aligned with the axes, and with sidelengths both on the order of $2^j$. In principle, the 2D inverse FFT could be used on this larger rectangle instead. This is close in spirit to the discretization of the continuous directional wavelet transform proposed by Vandergheynst and Gobbers in reference 41. This seems ideal, but there is an apparent downside to this approach: dramatic oversampling of the coefficients. In other words, whereas the previous approach showed that it was possible to design curvelets with anisotropic spatial spacing of about $n/2^j$ in one direction and $n/2^{j/2}$ in the other, this approach would seem to require a naive regular rectangular grid with sidelength about $n/2^j$ in both directions. In other words, one would need to compute on the order of $2^{2j}$ coefficients per scale and angle as opposed to only about $2^{3j/2}$ in the USFFT-based implementation. By looking at fine scale curvelets such that $2^j\sim n$, this approach would require $O(n^{2.5})$ storage versus $O(n^2)$ for the USFFT version.

It is possible, however, to downsample the naive grid, and obtain for each scale and angle a subgrid which has the same cardinality as that in use in the USFFT implementation. The idea is to periodize the frequency samples.

As before, we let $P_{j,l}$ be a parallelogram containing the support of the discrete localizing window $\tilde{U}_{j,l}[n_1,n_2]$. We suppose that at each scale j, there exist two constants $L_{1,j}\sim 2^j$ and $L_{2,j}\sim 2^{j/2}$ such that, for every orientation $\theta_l$, one can tile the two-dimensional plane with translates of $P_{j,l}$ by multiples of $L_{1,j}$ in the horizontal direction and $L_{2,j}$ in the vertical direction. The corresponding periodization of the windowed data $d[n_1,n_2]=\tilde{U}_{j,l}[n_1,n_2]\hat{f}[n_1,n_2]$ reads $$Wd[n_1, n_2] = \sum_{m_1 \in Z}\sum_{m_2 \in Z} d[n_1 + m_1 L_{1,j}, n_2 + m_2 L_{2,j}]$$

The wrapped windowed data, around the origin, is then defined as the restriction of $Wd[n_1,n_2]$ to indices $n_1,n_2$ inside a rectangle with sides of length $L_{1,j} \times L_{2,j}$ near the origin:

$$0 \leq n_1 < L_{1,j}, 0 \leq n_2 < L_{2,j}.$$

Given indices $(n_1,n_2)$ originally inside $P_{j,l}$ (possibly much larger than $L_{1,j}$, $L_{2,j}$), the correspondence between the wrapped and the original indices is one-to-one. Hence, the wrapping transformation is a simple re-indexing of the data. It is possible to express the wrapping of the array $d[n_1,n_2]$ around the origin even more simply by using the 'modulo' function:

$$Wd[n_1 \bmod L_{1,j}, n_2 \bmod L_{2,j}]=d[n_1,n_2],$$

with $(n_1,n_2)\epsilon P_{j,l}$. Intuitively, the modulo operation maps the original $(n_1,n_2)$ into their new position near the origin.

For those angles in the range $\theta\epsilon(\pi/4,3\pi/4)$, the wrapping is similar, after exchanging the role of the coordinate axes. This is the situation shown in FIG. 5.

Figure 5:
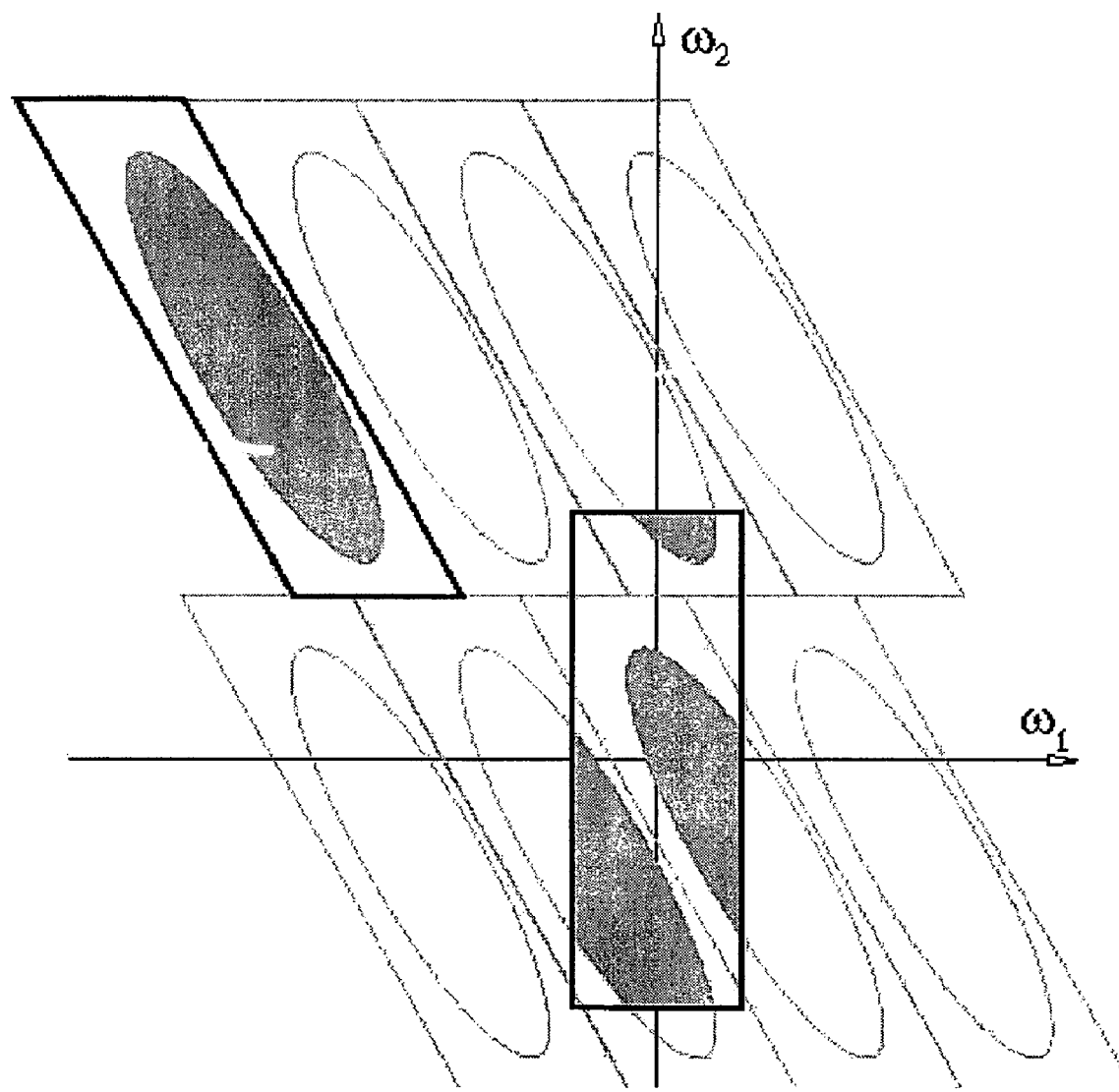
FIG. 5 shows a schematic showing the wrapping of data in a parallelogram by periodicity.

FIG. 5 is a schematic showing the wrapping of data in a parallelogram by periodicity. The angle θ is here in the range (π/4, 3π/4). The parallelogram is the tile $P_{j,l}$ which contains the frequency support of the curvelet, whereas the gray parallelograms are the replicas resulting from periodization. The rectangle is centered at the origin. The wrapped ellipse appears "broken into pieces" but, as seen in section 3.3 in the Annex, this is not an issue in the periodic rectangle, where the opposite edges are identified.

Equipped with this definition, the architecture of the fast digital curvelet transform by wrapping is generally as follows:

1. Apply the two dimensional fast Fourier transform and obtain Fourier samples $\hat{f}[n_1,n_2]$, $-n/2 \leq n_1, n_2 < n/2$.
2. For each scale j and angle l, form the product $\tilde{U}_{j,l}[n_1,n_2] \hat{f}[n_1,n_2]$.
3. Wrap this product around the origin and obtain $$\tilde{f}_{j,l}[n_1,n_2] = W(\tilde{U}_{j,l}\hat{f})[n_1,n_2],$$

where the range for $n_1$ and $n_2$ is now $0 \leq n_1 < L_{1,j}$ and $0 \leq n_2 < L_{2,j}$ (for θ in the range $(-π/4, π/4)$.)

4. Apply the inverse two dimensional fast Fourier transform to each $\tilde{f}_{j,l}$, hence collecting the discrete coefficients $c^D(j,l,k)$ This algorithm has computational complexity $O(n^2 \log n)$ and in practice its computational cost does not exceed that of 6 to 10 two-dimensional fast Fourier transforms. See Section 8 of the Annex for typical values of CPU times. Section 6 of the Annex details some of the properties of this transform, namely, (1) it is an isometry, hence the inverse transform can simply be computed as the adjoint, and (2) it is faithful to the continuous transform.

The elements which are common to both the USFFT and wrapping implementations are:

1. Frequency space is divided into dyadic annuli based on concentric squares.
2. Each annulus is subdivided into trapezoidal regions.
3. In the USFFT version, the discrete Fourier transform, viewed as a trigonometric polynomial, is sampled within each parallelogramal region according an equispaced grid aligned with the axes of the parallelogram. Hence, there is a different sampling grid for each scale/orientation combination. The wrapping version, instead of interpolation, uses periodization to localize the Fourier samples in a rectangular region in which the inverse fast Fourier transform can be applied. For a given scale, this corresponds only to two Cartesian sampling grids, one for all angles in the East-West quadrants, and one for the North-South quadrants.
4. Both forward transforms are specified in closed form, and are invertible (with inverse in closed form for the wrapping version).
5. The design of appropriate digital curvelets at the finest scale, or outermost dyadic corona, is not straightforward because of boundary/periodicity issues. Possible solutions at the finest scale are discussed in Section 7 of the Annex.
6. The transforms are cache-aware: all component steps involve processing n items in the array in sequence, e.g., there is frequent use of one-dimensional FFT's to compute n intermediate results simultaneously.

The design of appropriate basis functions at the finest scale, or outermost dyadic corona, is not as straightforward for directional transforms like curvelets as it is for one-dimensional or two dimensional tensor-based wavelets. This is a sampling issue in which, if a fine-scale curvelet is sampled too coarsely, the pixelization will make it look like a checkerboard and it will not be clear in which direction it oscillates anymore. In the frequency domain, the wedge-shaped support does not fit in the fundamental cell and its periodization introduces energy at unwanted angles.

Figure 10A:
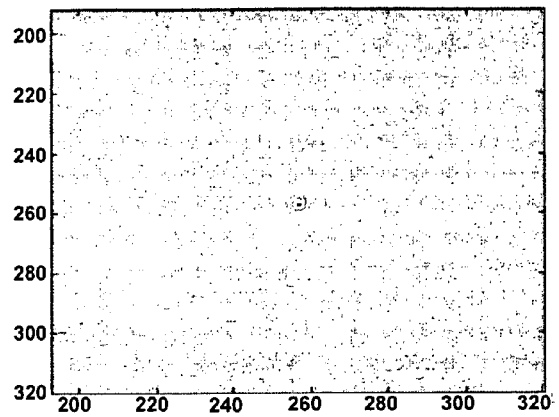
Figure 10B:
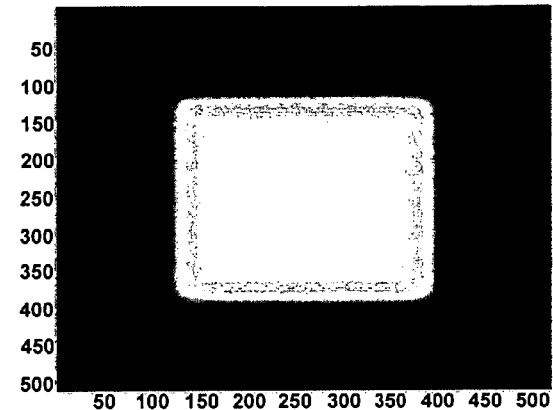

Section 7.1 of the Annex discusses the sampling of curvelets on the finest scale, or outermost dyadic corona by assigning wavelets to the finest level as illustrated in FIGS. 10A and 10B.

Figure 10C:
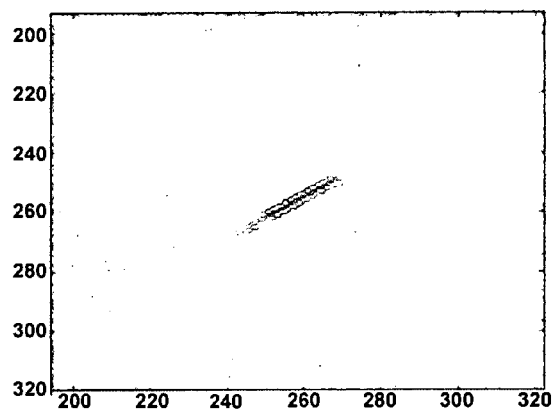
Figure 10D:
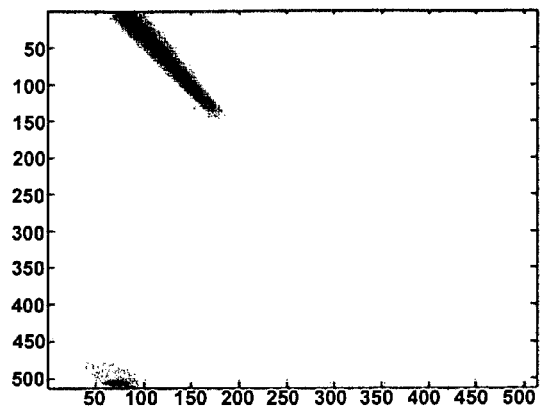
Figure 10E:
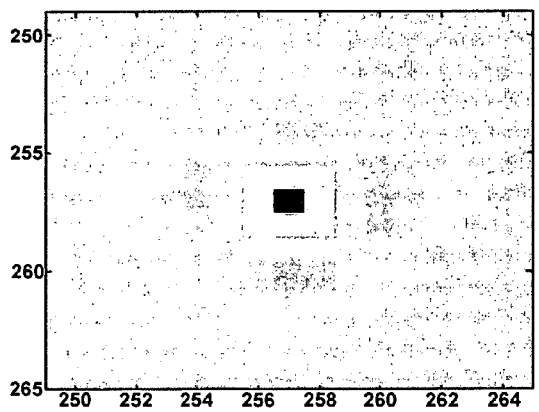
Figure 10F:
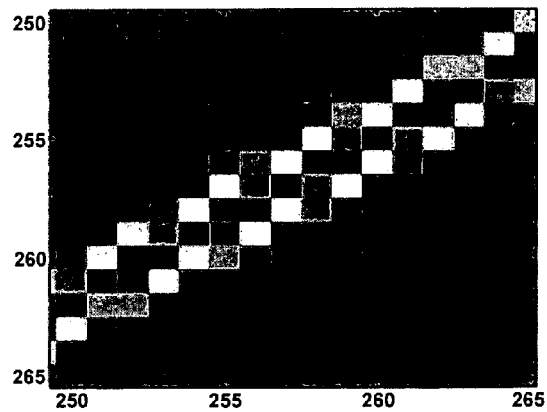

Periodization in frequency amounts to sampling in space, so finest-scale curvelets are just undersampled standard curvelets. This is illustrated in FIGS. 10C and 10D. What is lost in terms of aliasing? Spilling over by periodicity is inevitable, but here the aliased tail consists of essentially only one-third of the frequency support. FIG. 10D shows that a large fraction of the energy of the discrete curvelet still lies within the fundamental cell. Numerically, the non-aliased part amounts to about 92.4% of the total squared $l^2$-norm $\|\phi_{j,l,k}^D\|_{l^2}^2$. The "checkerboard" look of undersampled curvelets, mentioned above, is shown in FIG. 10F.

Figure 6A:
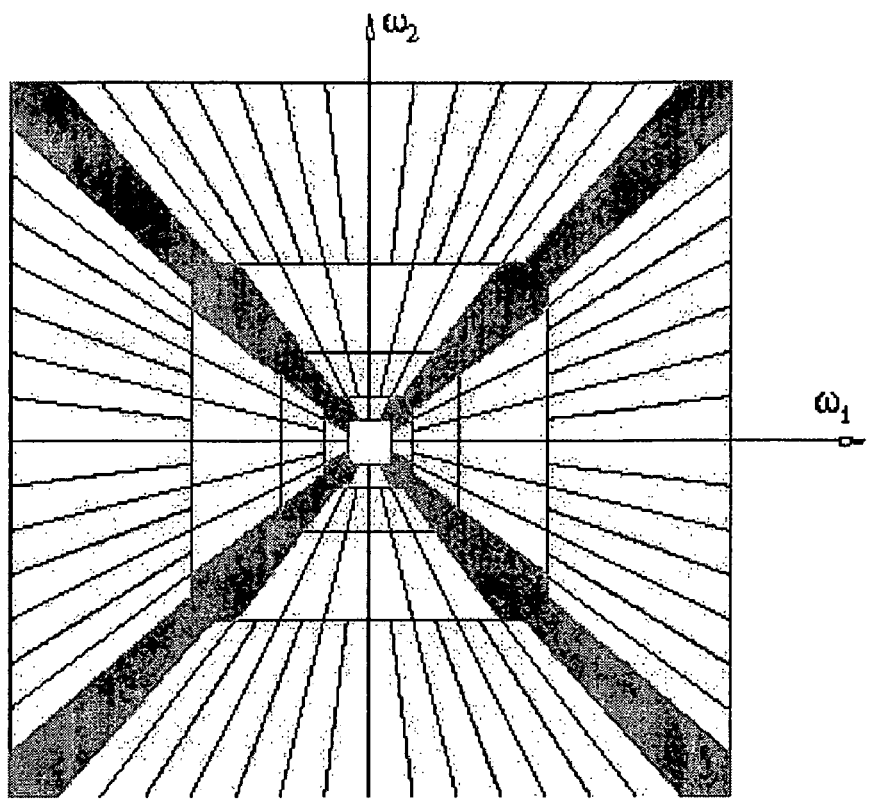
FIG. 6A is a schematic showing the construction of "windows" over corner quadrants at each scale.

Section 7.2 of the Annex explains how to construct windows over junctions between quadrants, namely the eight "corner" wedges per scale calling for special treatment, and corresponding to angles near ±π/4 and ±3π/4 (see FIG. 6A).

Figure 6B:
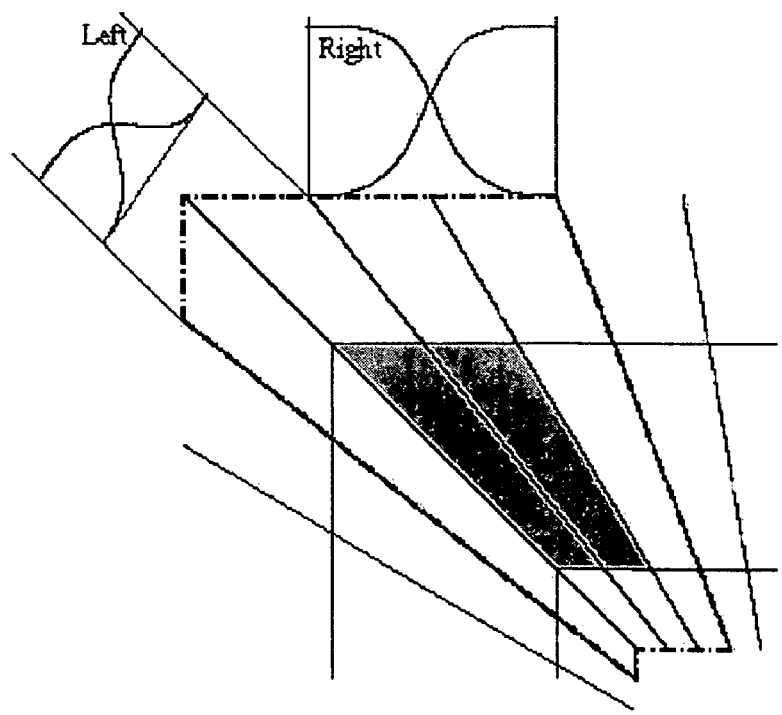
FIG. 6B shows a detail of the contruction of a partition of unity over the juncture between corner quadrants.

In FIG. 6A (corresponds to the left of FIG. 7 in the Annex) the corner wedges appear in grey. In FIG. 6B (corresponds to the right of FIG. 7 in the Annex) is shown a detail of the construction of a partition of unity over the junction between quadrants.

Section 7.3 of the Annex discusses alternative frequency tilings. The construction of curvelets is based on a polar dyadic-parabolic partition of the frequency plane, also called FIO tiling, as explained in Section 2 of the Annex. However, the approach is flexible, and can be used with a variety of choices of parallelogramal tilings, for example, including based on principles besides parabolic scaling.

Figure 7:
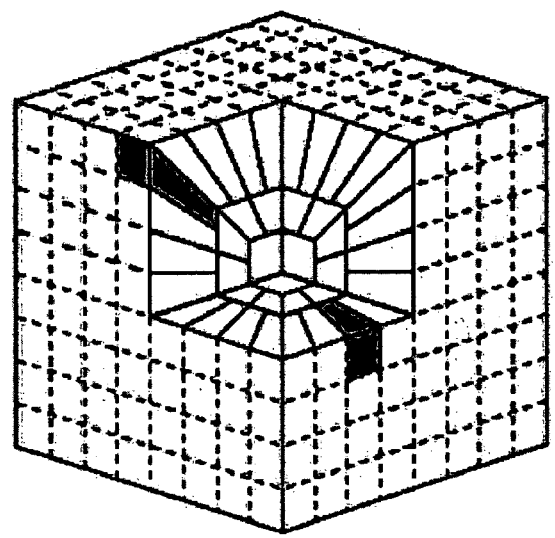
FIG. 7 shows a schematic illustrating the dyadic-parabolic frequency tiling in three dimensions.

Section 7.4 of the Annex discusses higher dimension fast digital curvelet transforms. The algorithms for three dimensional discrete curvelet transforms are similar to their two dimensional analogs. The object is first decomposed into dyadic annuli based on concentric cubes. FIG. 7 shows the dyadic-parabolic frequency tiling in three dimensions. Each annulus is subdivided into prismoid regions (having two rectangular and four trapezoidal faces) obeying the usual frequency parabolic scaling (one long and two short directions). These are now six components corresponding to the six faces of the cube. Curvelets are supported near the gray regions.

Section 7.5 discusses nonperiodic image boundaries An (unfortunate) consequence of using the digital Fourier transform (DFT) to define the transform is that the image is implicitly considered as a periodic array. The leftmost and rightmost pixels in a given row, or the top and bottom pixels in a given column, are considered immediate neighbors as much as ordinary adjacent pixels are. By construction, a substantial number of basis functions appear to be supported on two (or more) very distant regions of the image, because they overlap the image boundary and get copied by periodicity. They may be called "boundary curvelets." Periodization may result in unwanted curvelet-looking artifacts near the image boundary, for example in image denoising experiments. A somewhat naive solution is to pad the image with zeros.

Figure 8A:
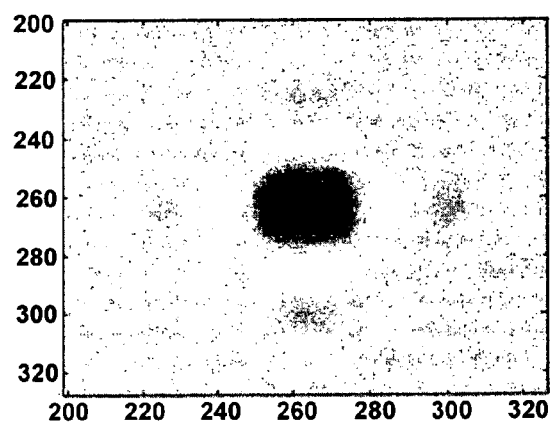
FIG. 8A shows curvelets at the coarsest scale in the spatial domain, in which white is most negative and black is most positive with zero corresponding to a tone of grey.
Figure 8B:
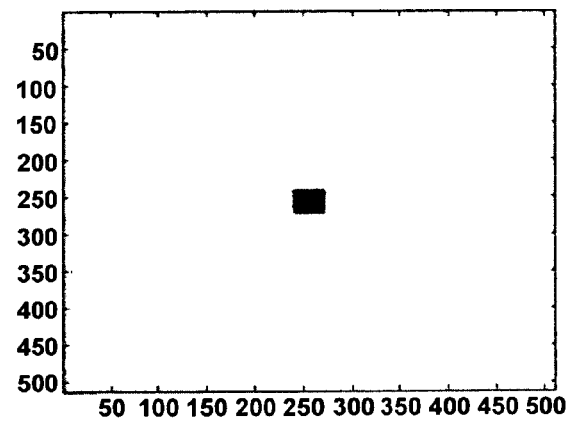
FIG. 8B shows curvelets at the coarsest scale in the frequency side (modulus of the Fourier transform), the level of grey indicatess values from zero (white) to one (black)

The drawings show a few curvelets in both the spatial and the frequency domain. FIGS. 8A and 8B show coarsest scale curvelets. At the coarsest level, curvelets are nondirectional and are Meyer scaling functions. FIG. 8A shows the spatial-side, in which the color map is as follows: white is most negative, zero corresponds to some tone of grey, and black is most positive. FIG. 8B shows the frequency-side (modulus of the Fourier transform). The level of grey indicates values from zero (white) to one (black).

Figures 9A, 9B, 9C, 9D, 9E, 9F:
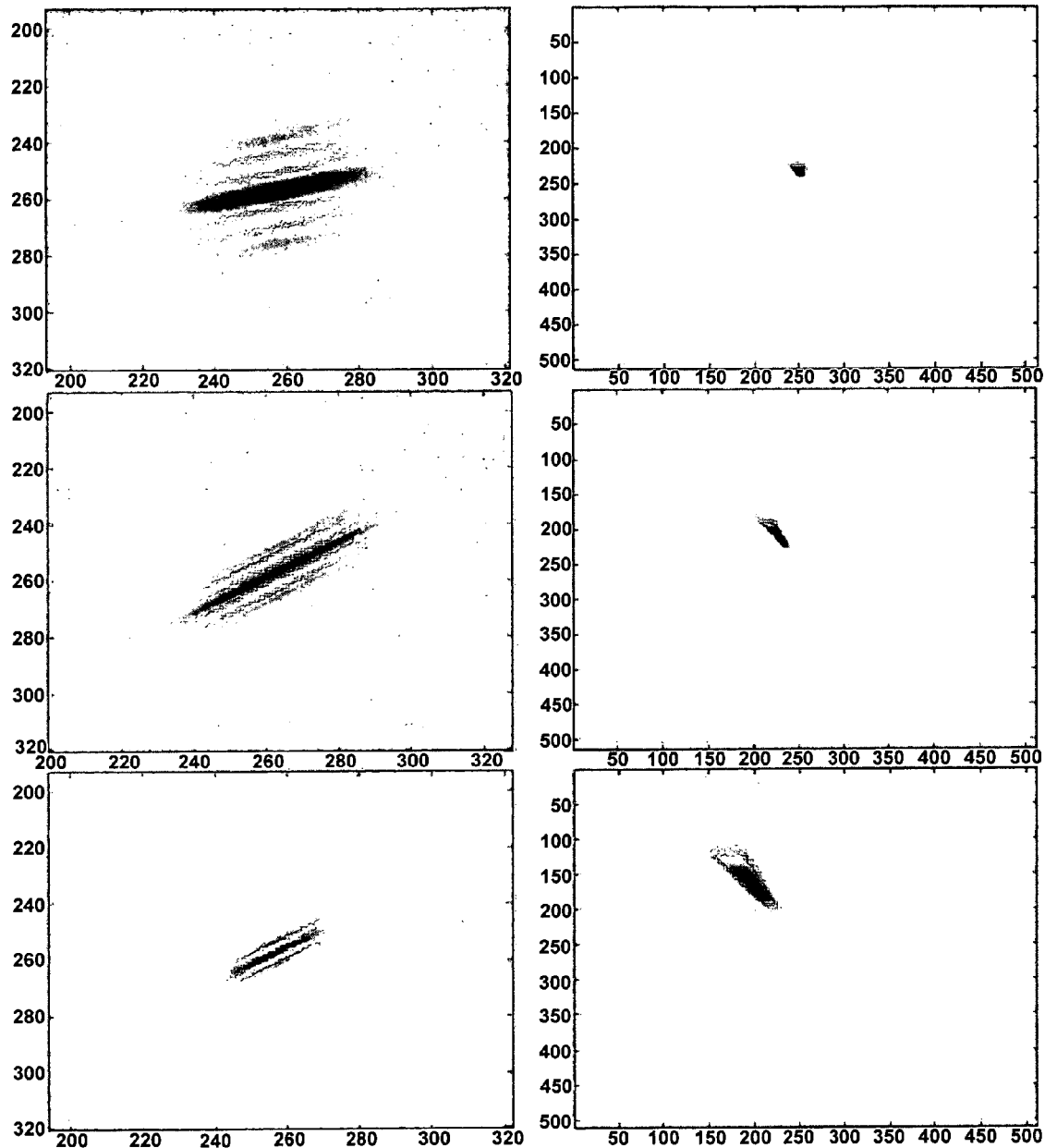

FIG. 9 shows curvelets at increasingly fine scales in which the left panels represent the real part of curvelets in the spatial domain (as functions of the spatial variable x) and the right panels show the modulus of the Fourier transform (as functions of the frequency variable ω). The color map is the same as in FIG. 8.

FIGS. 10A-10F show curvelets at the finest level where one can choose between wavelets and curvelets. Localization in both space and frequency is apparent. The digital curvelets appear to be faithful to their continuous analog. In the spatial domain, they are smooth along and oscillatory across the ridge. In the frequency domain, they are sharply localized.

Tables 1 and 2 (Tables 2 and 3 in the Annex) report the running time of both FDCT's on a sequence of arrays of increasing size. $T_{Fwd}$, $T_{Inv}$ and $T_{Adj}$ are running times of the forward, inverse and adjoint transforms respectively (only $T_{Inv}$ is given for the FDCT via wrapping since the inverse is the same as the adjoint). The column $T_{Fwd}/T_{FFT}$ gives the ratio between the running time of the FDCT and that of the FFT on an array of the same size. The accuracy or $l^2$-error is computed as $\|f-C_{Inv}C_{Fwd}f\|_{l^2}/\|f\|_{l^2}$, where $C_{Inv}$ and $C_{Fwd}$ are the forward and inverse FDCT's. The FDCT via wrapping achieves machine accuracy because of the exact numerical tightness of the digital transform. The FDCT via USFFT also achieves high accuracy, i.e., of the order of $10^{-6}$. Although both transforms have low running times, the USFFT transform is somewhat slower; this is due to the interpolation step in the forward transform and to the Conjugate Gradient (CG) iterations in the inverse transform.

TABLE 1

Running time and error for the wrapping-based transform.

| Image size | $T_{Fwd}(s)$ | $T_{Inv}(s)$ | $T_{Fwd}/T_{FFT}$ | $l^2$ error |
|---|---|---|---|---|
| 128 × 128 | 0.040458 | 0.039520 | 11.2383 | 4.5450e−16 |
| 256 × 256 | 0.174807 | 0.176519 | 8.8286 | 4.8230e−16 |
| 512 × 512 | 0.829820 | 0.868141 | 6.0793 | 4.8908e−16 |
| 1024 × 1024 | 4.394066 | 4.482452 | 7.7224 | 5.6303e−16 |
| 2048 × 2048 | 20.01692 | 23.02144 | 7.7567 | 6.3018e−16 |

TABLE 2

Running time and error for the USFFT-based transform.

| Image size | $T_{Fwd}(s)$ | $T_{Adj}(s)$ | $T_{Inv}(s)$ | $T_{Fwd}/T_{FFT}$ | $l^2$ error |
|---|---|---|---|---|---|
| 128 × 128 | 0.088832 | 0.091578 | 1.006522 | 24.6756 | 1.4430e−06 |
| 256 × 256 | 0.376838 | 0.390533 | 4.002353 | 19.0322 | 8.8154e−07 |
| 512 × 512 | 2.487052 | 2.579102 | 35.09599 | 18.2202 | 5.3195e−07 |
| 1024 × 1024 | 16.47702 | 16.87764 | 129.3631 | 28.9579 | 3.2390e−07 |
| 2048 × 2048 | 62.42980 | 65.09365 | 566.1732 | 24.1920 | 3.4305e−06 |

Figure 11A:
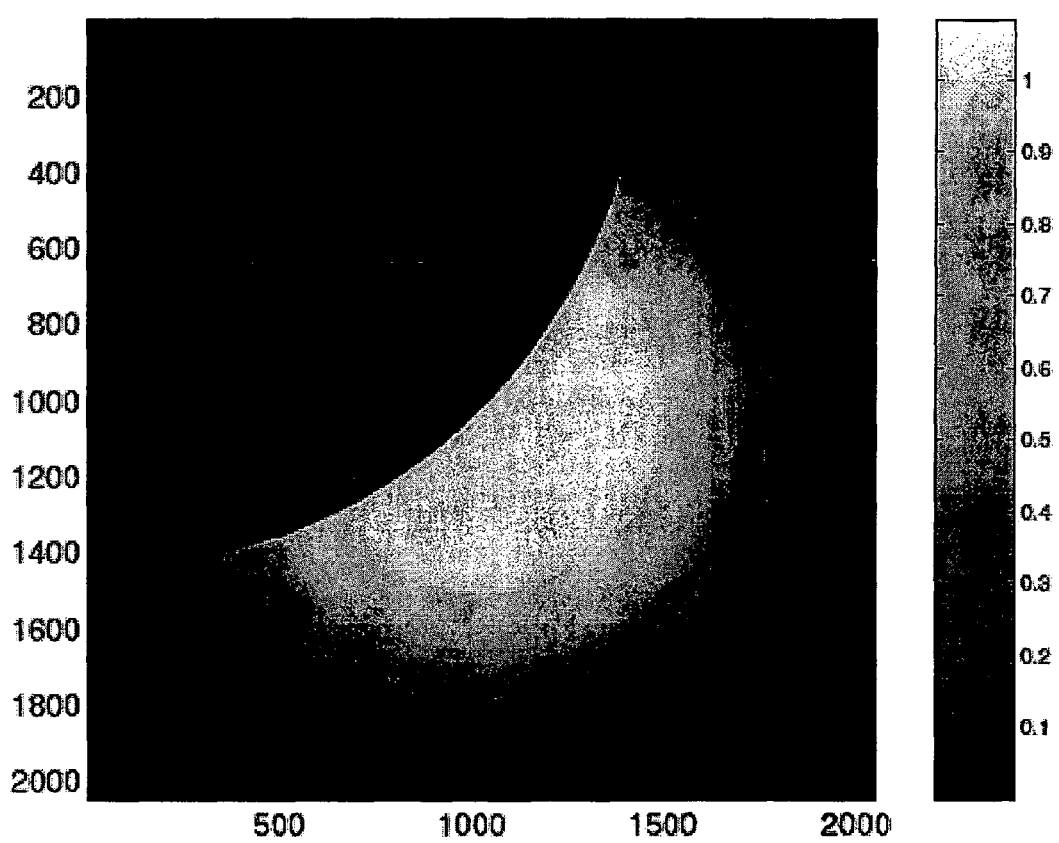

The potential of FDCT's is illustrated with several examples using the wrapping-based implementation. In the first example, the decay of the coefficients of the curvelet and various wavelet representations are compared on an image with curve-like singularities. The first input image, shown in FIG. 11A, is singular along a smooth curve and is otherwise perfectly smooth (this image is de-aliased to remove the artifacts due to pixelization). To compensate for the redundancy of the curvelet transform and display a meaningful comparison, a fraction of the entries of the curvelet coefficient table are extracted so that the number of curvelet and wavelet coefficients is identical. The extracted curvelet entries are renormalized to preserve the overall $l^2$ norm.

Figure 11B:
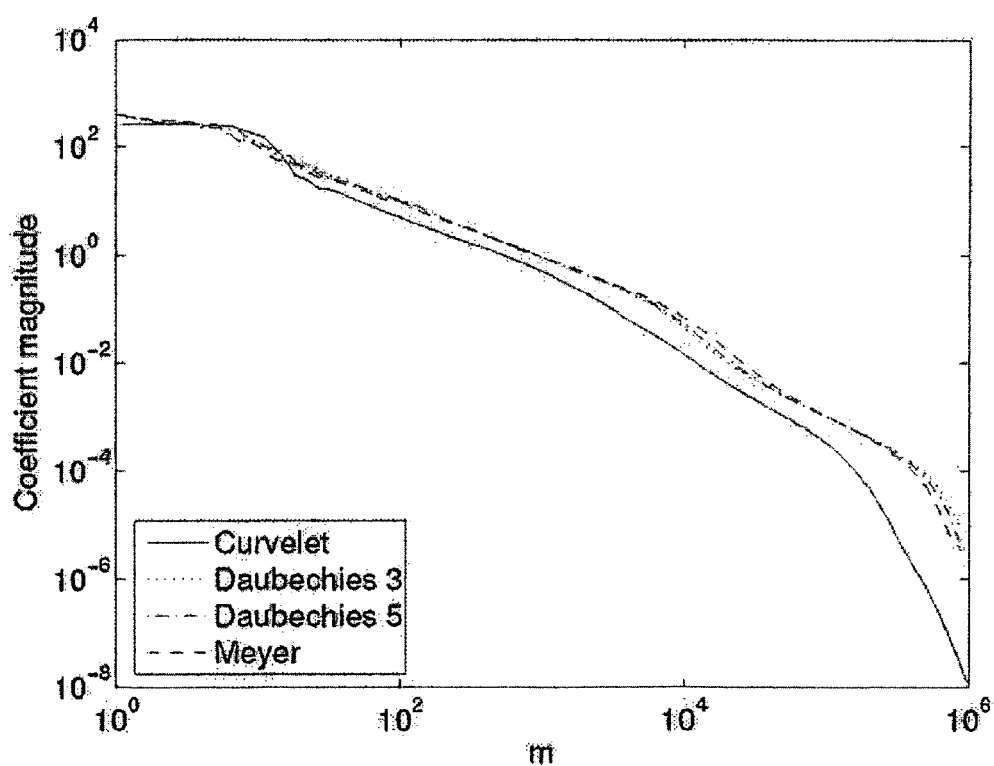
Figure 11C:
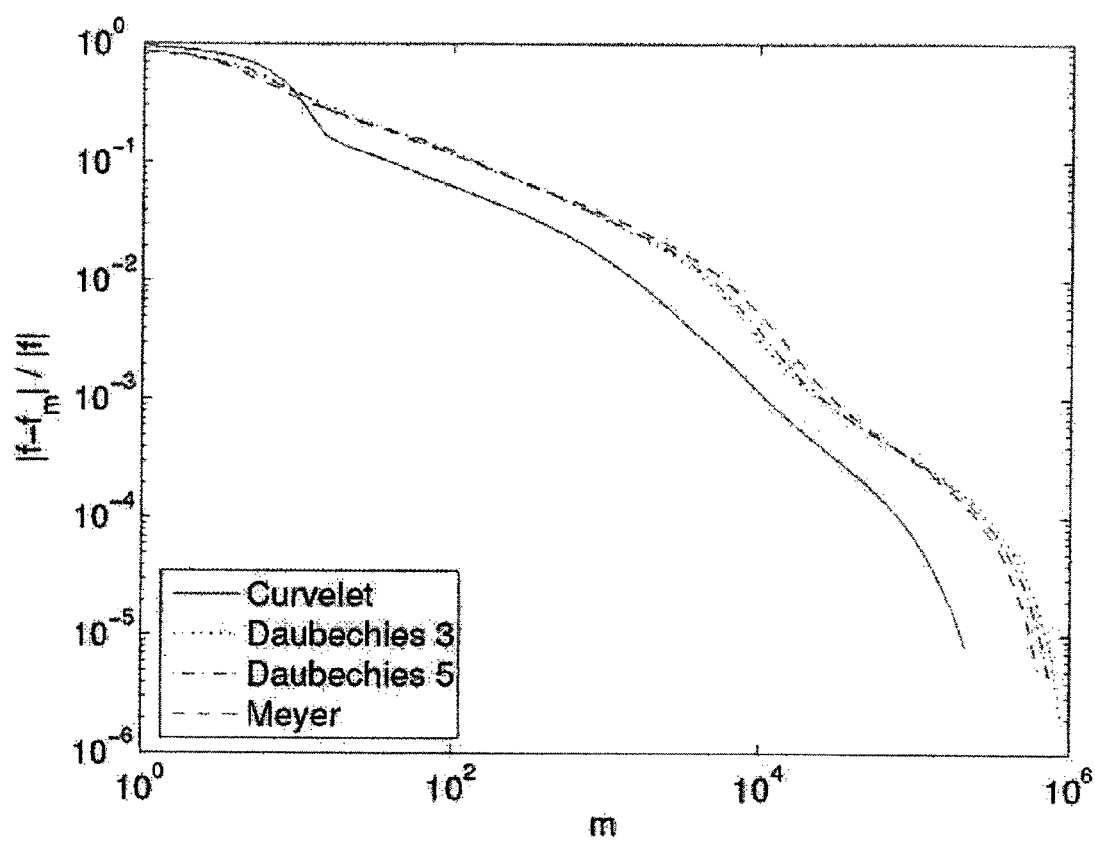

FIG. 11B shows the values of the coefficients sorted in decreasing order of magnitude. The faster the decay, the better. The sparsity analysis of the curvelet and wavelet (Daubechies 3, Daubechies 5, and Meyer) representations is complemented by the quantitative study of partial reconstructions of f. FIG. 11C shows the peak signal to noise (PSNR) of best m-term approximation where $f_m$ is the partial reconstruction of f using the m-largest coefficient in the curvelet (or wavelet) expansion (note that because of the redundancy of the FDCT, there are better ways of obtaining partial reconstructions).

Figure 12A:
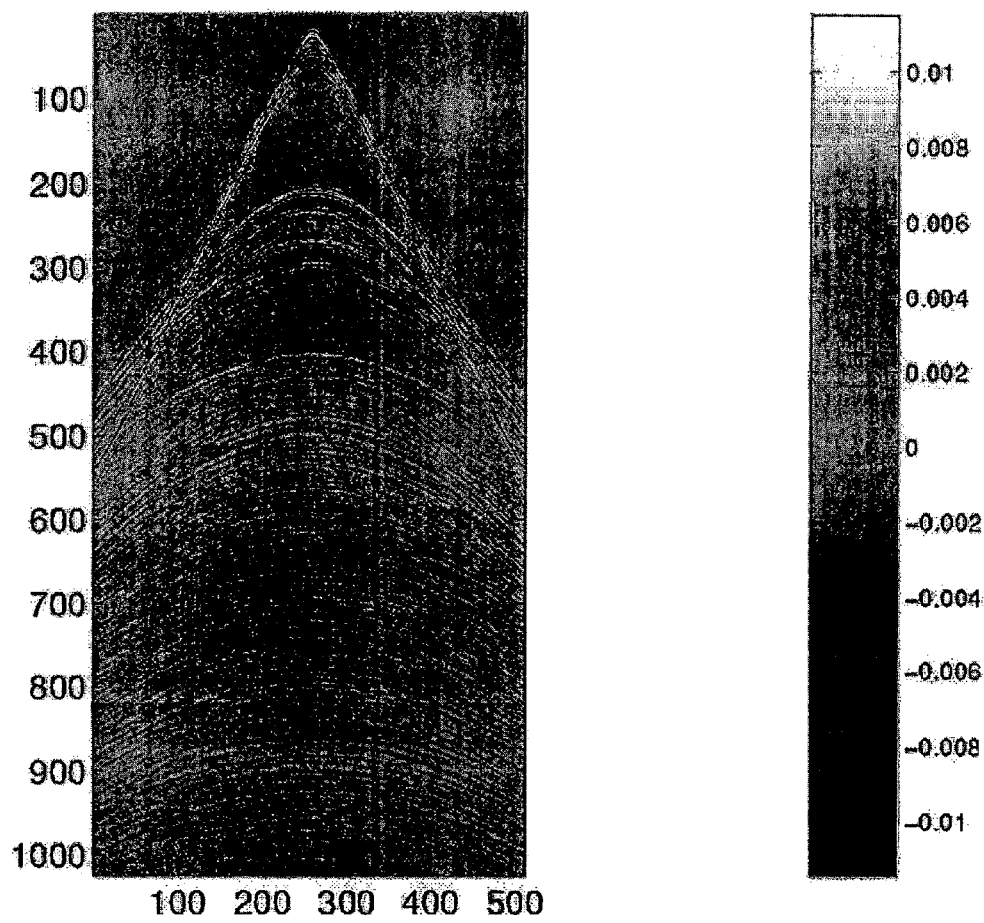
Figure 12B:
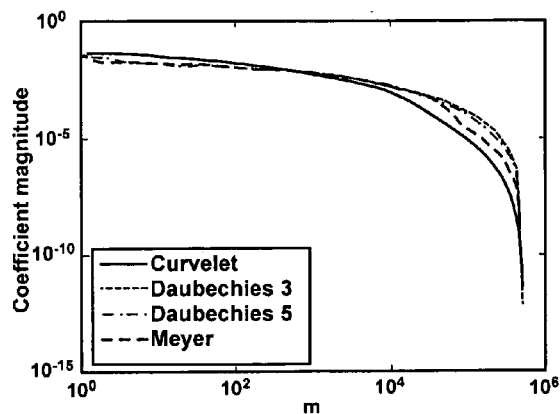
Figure 12C:
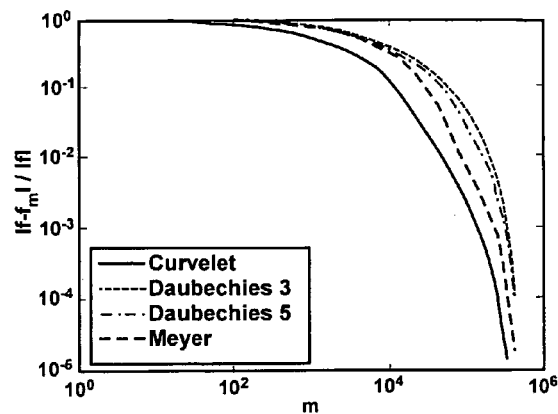

The second input image, shown in FIG. 12A, is a synthetic seismogram corresponding to the acoustic response of a one-dimensional layered medium to a point source. The x-axis is the offset from the source and the y-axis is time. The decay of the coefficients and the partial reconstruction error for this image are shown in FIGS. 12B and 12C, respectively. Experiments suggest that FDCT's outperform, by a significant margin, traditional wavelet representations on these types of image data.

Figure 13A:
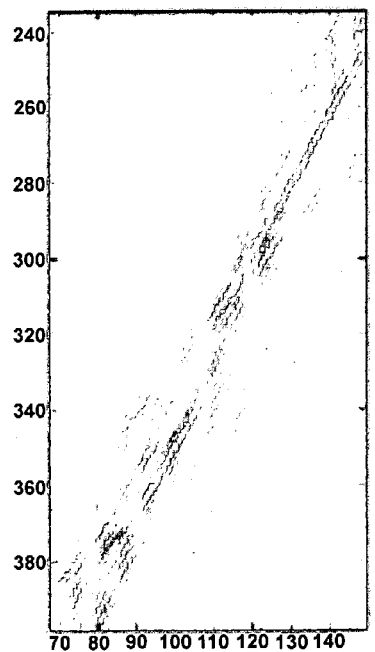
Figure 13B:
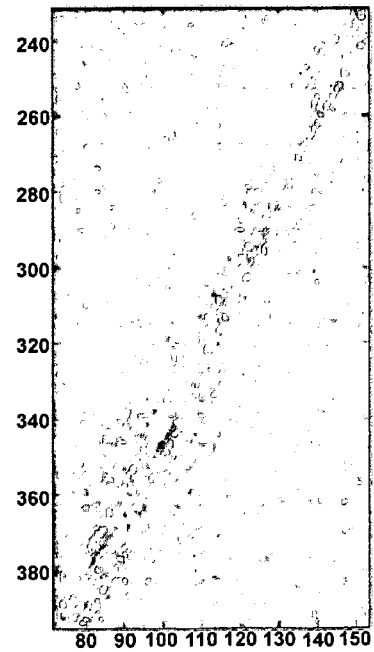

The second example is denoising. The original image is the seismogram used in the previous example (FIG. 12A), a portion of which is shown in FIG. 13A. The noise-to-signal ratio is set to 10%, which corresponds to peak signal-to-noise (PSNR)=20.0 dB (shown in FIG. 13B). A denoising algorithm based on the curvelet transform results in an image with PSNR=37.6 dB. (see FIG. 13C) while a traditional wavelet denoising algorithm (Symmlet 8 in WaveLab, shift-invariant hard thresholding at 2.5σ) gives PSNR=30.8 dB (see FIG. 13D). The curvelet denoising algorithm used above is a simple shift-invariant block-thresholding of the wrapping-based curvelet transform (with curvelets at the finest scale) and is available as Matlab code in the CurveLab software referred to above. (For an image of size 1024×512, the whole procedure runs in less than 90 seconds on a standard desktop computer.)

Curvelets are especially well-adapted to simultaneously represent the solution operators to large classes of wave equations and the wavefields that are solutions to those equations. In the third example, consider the constant coefficient second-order wave equation with periodic boundary condition $$u_{tt}-\Delta u=0 \; x\in[0,1)\times[0,1).$$

Figure 14D:
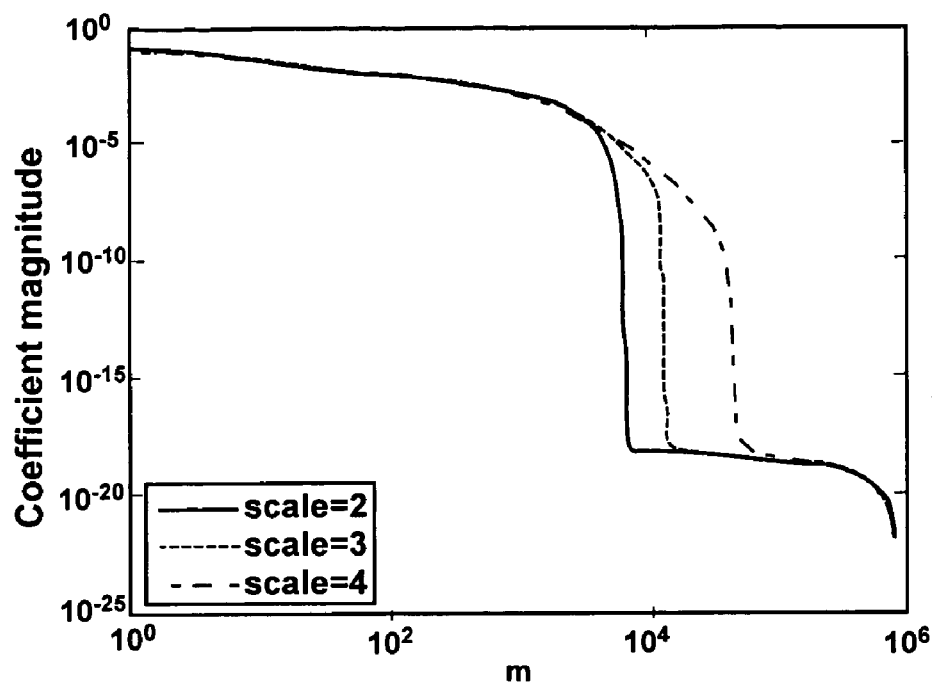

FIGS. 14A-14D illustrate compression of the wavefield and of the solution operator to the wave equation with periodic boundary conditions. The domain is discretized with a 512×512 Cartesian grid, and a delta function located at the center of the domain is the wavefield that is provided as an initial condition, as shown in FIG. 14A. The solution at a later time is known analytically, and may therefore be computed exactly. The FDCT is used to compress the wavefield at time t=0.25 (FIG. 14B) and t=0.75 (FIG. 14C). FIGS. 14B and 14C show the approximate wavefields reconstructed from only 1.25% of the curvelet coefficients. In both cases, the relative $l^2$ error is about $10^{-5}$.

Figure 14E:
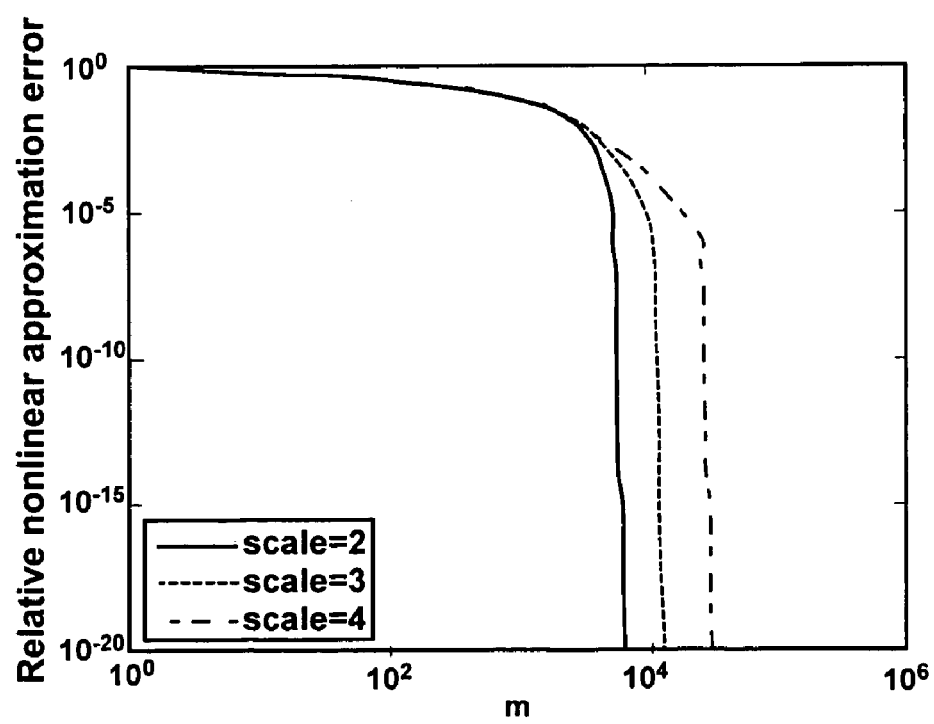

The wavefield is well-approximated by just a few curvelets. Now consider the compressibility of the wave propagator $E_t$. From a theoretical point of view, it is known that the entries of $E_t(n,n')=\langle\phi_n,E_t\phi_{n'}\rangle$ taken from an arbitrary row or column decay faster than any negative polynomial. FIG. 14D plots the decay of the matrix coefficients in three columns of the propagator matrix or solution operator $E_t$ at t=0.75 while FIG. 14E plots the relative truncation error for those same columns. A relative error of order $10^{-5}$ for every column is achieved by using about 1% of the largest curvelet coefficients.

The transforms introduced in this specification were designed with the goal of being as faithful to continuous curvelets as possible. In both cases, the main step of the transform is to window the data in frequency with prescribed windows, sampled on the same grid as the data. This sampling in frequency is the only distortion that curvelets incur in the digital transforms. This issue is inevitable but minor, since it is equivalent to periodization in space where curvelets decay fast. Recall that the other potential source of error, spatial sampling, is not an issue here since curvelets are nearly band-limited.

Both transforms are fast and the wrapping variant is to believed to be the fastest curvelet transform currently available. Computing a direct or inverse transform in C++ takes about the same time as 6 to 10 FFT's using FFTW ("Fastest Fourier Transform in the West," a C subroutine library for computing the discrete Fourier transform (DFT)) (available at http://www.fftw.org), which can hardly be improved upon.

Just as the wavelet transform has been deployed a countless number of times in many fields of science and technology, fast digital curvelet transforms may be expected to be widely applicable. This is especially the case in the field of image processing and scientific computing.

In image analysis for example, the fast digital curvelet transform may be used for the compression of image data, for the enhancement and restoration of images as acquired by many common data acquisition devices (e.g., computerized tomography (CT) scanners), and for post-processing applications such as extracting patterns from large digital images, detecting features embedded in very noisy images, enhancing low contrast images, or registering a series of images acquired with very different types of sensors.

In scientific computing, the fast digital curvelet transform may be used for speeding up fundamental computations; the numerical propagation of waves in inhomogeneous media is of special interest. Other applications include seismic migration and velocity estimation in the field of seismics and computational geophysics.

The FDCT may be used to solve problems in limited-angle tomography. In this field, one tries to reconstruct an image from a limited range of projection angles but very dense sampling within the range of observable angles and offsets. This problem arises in many important medical applications but also in Synthetic Aperture Radar (SAR) imaging and tomographic electron microscopy where data are collected in a ±70 degree cone, but with very densely sampled data inside the cone. In these challenging setups, the FDCT may be used to separate the image of interest from noise and clutters and provide sharp reconstructions of selected image features.

The following references have been cited in the specification, either above or in the Annex:

1. C. R. Anderson and M. D. Dahleh. Rapid computation of the discrete Fourier transform. *SIAM J. Sci. Comput.* 17 (1996), 913-919.
2. G. Beylkin, R. Coifman and V. Rokhlin. Fast wavelet transforms and numerical algorithms. *Comm. on Pure and Appl. Math.* 44 (1991), 141-183.
3. G. Beylkin. On the fast Fourier transform of functions with singularities. *Appl. Comput. Harmon. Anal.*, 2-4 (1995), 363-381.
4. E. J. Candès. Harmonic analysis of neural networks. *Applied and Computational Harmonic Analysis* 6 (1999), 197-218.
5. E. J. Candès and L. Demanet, The curvelet representation of wave propagators is optimally sparse, *Comm. Pure Appl. Math.*, 58-11 (2005) 1472-1528.
6. E. J. Candès and L. Demanet. Curvelets and fast wave equation solvers. Technical report, California Institute of Technology, 2005. In preparation.
7. E. J. Candès and D. L. Donoho. Ridgelets: the key to higher-dimensional intermittency? *Phil. Trans. R. Soc. Lond. A.* 357 (1999), 2495-2509.
8. E. J. Candès and D. L. Donoho. Curvelets—a surprisingly effective nonadaptive representation for objects with edges. In C. Rabut A. Cohen and L. L. Schumaker, editors, *Curves and Surfaces*, pages 105-120, Vanderbilt University Press, 2000. Nashville, Tenn.
9. E. J. Candès and D. L. Donoho. Recovering edges in ill-posed inverse problems: Optimality of curvelet frames. *Ann. Statist.* 30 (2002), 784-842.
10. E. J. Candès and D. L. Donoho. New tight frames of curvelets and optimal representations of objects with piecewise-$C^2$ singularities. *Comm. on Pure and Appl. Math.* 57 (2004), 219-266.
11. E. J. Candès and D. L. Donoho. Curvelets: new tools for limited-angle tomography, Manuscript, 2004.
12. E. J. Candès and F. Guo. New multiscale transforms, minimum total variation synthesis: application to edge-preserving image reconstruction. *Sig. Process., special issue on Image and Video Coding Beyond Standards* 82 (2002), 1519-1543.
13. R. H. Chan and M. K. Ng. Conjugate gradient methods for Toeplitz systems. *SIAM Rev.* 38 (1996), 427-482.
14. M. N. Do. *Directional Multiresolution Image Representations*. PhD thesis, Swiss Federal Institute of Technology, Lausanne, November 2001.
15. M. N. Do and M. Vetterli, Contourlets, in *Beyond Wavelets*, G. V. Welland ed., Academic Press, 2003.
16. M. N. Do and M. Vetterli, The contourlet transform: an efficient directional multiresolution image representation, *IEEE Trans. Im. Proc.*, to appear, 2005.
17. D. L. Donoho. Wedgelets: nearly-minimax estimation of edges. *Ann. Statist.* 27 (1999), 859-897.
18. D. L. Donoho and M. R. Duncan. Digital Curvelet Transform: Strategy, Implementation, Experiments. Technical Report, Stanford University, 1999.
19. D. L. Donoho and X. Huo. *Beamlets and Multiscale Image Analysis*. Springer, Lecture Notes in Computational Science and Engineering: Multiscale and Multiresolution Methods, 2001.
20. H. Douma and M. V. de Hoop. Wave-character preserving prestack map migration using curvelets. Presentation at the *Society of Exploration Geophysicists*, Denver, Colo., 2004.
21. A. J. W. Duijndam and M. A. Schonewille, Nonuniform fast Fourier transform. *Geophys.* 64-2 (1999), 539-551.
22. A. Dutt and V. Rokhlin. Fast Fourier transforms for non-equispaced data. *SIAM J. Sci. Stat. Comput.* 14-6 (1993), 1368-1393.
23. A. Dutt and V. Rokhlin, Fast Fourier transforms for non-equispaced data II. *Appl. Comput. Harmon. Anal.*, 2 (1995), 85-100.
24. A. G. Flesia, H. Hel-Or, A. Averbuch, E. J. Candès, R. R. Coifman and D. L. Donoho. Digital implementation of ridgelet packets, *Beyond Wavelets*, J. Stoeckler and G. V. Welland eds., Academic Press, 2003.
25. G. Hennenfent and F. J. Hermann, Seismic denoising with unstructured curvelets, submitted, 2005.

26. F. J. Herrmann and E. Verschuur. Separation of primaries and multiples by non-linear estimation in the curvelet domain. In *EAGE 66th Conference & Exhibition Proceedings*, 2004.
27. F. J. Herrmann, P. P. Moghaddam, and C. C. Stolk, Sparsity- and continuity-promoting seismic image recovery with curvelet frames. Submitted, 2005.
28. K. Guo, D. Labate, W. Lim, G. Weiss, and E. Wilson, Wavelets with Composite Dilations, *Electr. Res. Ann. AMS* 10 (2004), 78-87.
29. K. Guo, D. Labate, W. Lim, G. Weiss, and E. Wilson, Wavelets with Composite Dilations and their MRA Properties, to appear in *Appl. Comput. Harmon. Anal.* (2005).
30. D. Labate, W. Lim, G. Kutyniok and G. Weiss, "Sparse Multidimensional Representation using Shearlets, *SPIE conf Wavelets XI*, San Diego, USA, 2005.
31. E. Le Pennec and S. Mallat. Sparse geometric image representations with bandelets. *IEEE Trans. Image Process.* 14 (2005), 423-438.
32. R. Murenzi, *Ondelettes multidimensionelles et applications a l'analyse d'images*, Thèse, Université Catholique de Louvain, Louvain-la-Neuve, 1990.
33. F. Natterer. *The mathematics of computerized tomography*. B. G. Teubner; John Wiley & Sons, 1986.
34. E. P. Simoncelli and W T Freeman. The Steerable Pyramid: A Flexible Architecture for Multi-Scale Derivative Computation. *IEEE Second Int'l Conf on Image Processing*. Washington D.C., October 1995.
35. E. P. Simoncelli, W. T. Freeman, E. H. Adelson, and D. J. Heeger. Shiftable multi-scale transforms [or what's wrong with orthonormal wavelets]. *IEEE Trans. Information Theory, Special Issue on Wavelets* 38 (1992), 587-607.
36. H. A. Smith. A parametrix construction for wave equations with $C^{1,1}$ coefficients. *Ann. Inst. Fourier (Grenoble)* 48 (1998), 797-835.
37. J.-L. Starck, E. J. Candès, and D. L. Donoho. The curvelet transform for image denoising. *IEEE Trans. Im. Proc.*, 11-6 (2002), 670-684.
38. J.-L. Starck, N. Aghanim and O. Formi, Detecting cosmological non-Gaussian signatures by multi-scale methods. *Astronomy and Astrophysics* 416 (2004), 9-17.
39. J. L. Starck, M. Elad, and D. L. Donoho. Redundant multiscale transforms and their application for morphological component analysis. *Advances in Imaging and Electron Physics* 132 (2004).
40. G. Strang. A proposal for Toeplitz matrix-calculations. *Stud. Appl. Math.* 74 (1986), 171-176.
41. P. Vandergheynst and J. F. Gobbers, Directional dyadic wavelet transforms: design and algorithms. *IEEE Trans. Im. Proc.* 11-4 (2002), 363-372.
42. A. Zygmund. *Trigonometric* series, Cambridge University Press, 1964.

References 1-42 are incorporated by reference for all purposes allowed by law.

While several illustrative embodiments of the invention have been shown and described in the above description, numerous variations and alternative embodiments will occur to those skilled in the art and it should be understood that, within the scope of the appended claims, the invention may be practiced otherwise than as specifically described. Such variations and alternative embodiments are contemplated, and can be made, without departing from the scope of the invention as defined in the appended claims.

We claim:

1. A method for transforming an image for use with a data processor comprising:

converting said image to a plurality of image pixel data; and performing a discrete curvelet transformation on the plurality of image pixel data, wherein the performing of the discrete curvelet transform comprises:

representing the plurality of image pixel data in the frequency space or Fourier domain by means of a Fourier transform; and dividing the Fourier transform of the plurality of image pixel data into dyadic annuli based on concentric squares for two-dimensional data or concentric cubes for three-dimensional data and each annulus is subdivided into trapezoidal regions for two-dimensional data or prismoids for three-dimensional data.

2. The method for transforming an image according to claim 1, wherein the division of the frequency plane comprises using a smooth partition of unity, or square-root thereof, made of overlapping indicators.

3. The method for transforming an image according to claim 1, wherein each trapezoidal or prismoidal region corresponds to a given scale/orientation combination.

4. The method for transforming an image according to claim 1, wherein which the performing of the discrete curvelet transform further comprises:

resampling the array of the plurality of image pixel data within each trapezoidal or prismoidal region in the Fourier domain, according to an equispaced grid tilted to be aligned with the axes of the trapezoid or prismoid;

shearing each tilted grid into a Cartesian grid; and applying the inverse Fast Fourier Transform to the data array on each Cartesian grid.

5. The method according to claim 4, wherein the resampling within each trapezoidal or prismoidal region further comprises performing unequispaced Fast Fourier Transforms.

6. The method for transforming an image according to claim 1, wherein the performing of the digital curvelet transform on the plurality of image pixel data further comprises:

wrapping the array of the plurality of image pixel data within each trapezoidal or prismoidal region in the Fourier domain into a rectangular or parallelepipedal region near the origin; and applying the inverse Fast Fourier Transform to each wrapped data array, within the rectangular or parallelepipedal region near the origin.

7. The method according to claim 6, wherein the wrapping of the plurality of image pixel data within each trapezoidal or prismoidal region comprises making use of periodization to extend Fourier samples inside the rectangular or parallelepipedal region.

8. The method according to claim 6 being an isometry in exact arithmetic.

9. The method according to claim 1, wherein the performing of the discrete curvelet transform runs in $O(n^2 \log n)$ floating point operations for n by n Cartesian arrays, wherein n is the number of discrete information bits in a direction along an x or a y axis.

10. The method according to claim 1, wherein the performing of the discrete curvelet transform runs in $O(n^3 \log n)$ floating point operations for n by n by n Cartesian arrays, wherein n is the number of discrete information bits in a direction along an x, a y, or a z axis.

11. The method according to claim 1, wherein the performing of the discrete curvelet transform further comprises returning a table of digital curvelet coefficients indexed by a scale parameter, an orientation parameter, and a spatial location parameter.

12. The method according to claim 1, wherein the discrete curvelet transform is invertible by means of an inverse discrete curvelet transform.

13. The method according to claim 12, wherein the performing of the inverse discrete curvelet transform comprises:
   taking as input the table of digital curvelet coefficients; and
   performing a Fast Fourier transform of the coefficients at each scale and angle.

14. The method according to claim 13, wherein the performing of the inverse discrete curvelet transform further comprises:
   shearing the array of the Fourier-transformed data at each scale and angle onto a trapezoidal or prismoidal grid;
   resampling each sheared data onto a Cartesian grid;
   windowing by a corresponding indicator;
   summing a contribution at each scale and angle to produce a sum; and
   performing an inverse Fourier transform of the sum.

15. The method according to claim 14, wherein the resampling of the sheared data comprises performing inverse unequispaced Fast Fourier transforms.

16. The method according to claim 13, wherein the performing of the inverse discrete curvelet transform further comprises:
   unwrapping the array of the Fourier-transformed data at each scale and angle onto a trapezoidal or prismoidal region;
   windowing by the corresponding indicator;
   summing the contribution from each scale and angle; and
   performing an inverse Fourier transform of the sum.

17. The method according to claim 16, wherein the unwrapping of the array of the Fourier-transformed data onto a trapezoidal or prismoidal region comprises making use of periodization to extend Fourier samples inside the trapezoidal or prismoidal region.

18. The method according to claim 13, wherein the inverse discrete curvelet transform runs in about $O(n^2 \log n)$ floating point operations for n by n Cartesian arrays, wherein n is a number of discrete information bits in a direction along an x or a y axis.

19. The method according to claim 13, wherein the inverse discrete curvelet transform runs in about $O(n^3 \log n)$ floating point operations for n by n by n Cartesian arrays, wherein n is a number of discrete information bits in a direction along an x, a y or a z axis.

20. The method according to claim 1, wherein the transforming of the image comprises compressing the plurality of image pixel data.

21. The method according to claim 1, wherein the transforming of the image comprises identifying transients or salient features in the plurality of image pixel data.

22. The method according to claim 1, wherein the transforming of the image is used to conduct numerical simulations of partial differential equations.

23. The method according to claim 1, wherein the transforming of the image further comprises removing noise from the plurality of image pixel data, or restore otherwise degraded image pixel datasets.

24. The method according to claim 1, wherein the transforming of the image is used to solve inverse problems.

25. The method according to claim 24, wherein the transforming of the image is used to solve inverse problems in computerized tomography.

26. The method according to claim 25, wherein the transforming of the image is used to solve inverse problems in limited-angle tomography.

* * * * *